(12) United States Patent
Chan et al.

(10) Patent No.: US 10,878,457 B2
(45) Date of Patent: Dec. 29, 2020

(54) TUNABLE STATISTICAL IDS

(71) Applicant: ORACLE INTERNATIONAL CORPORATION, Redwood Shores, CA (US)

(72) Inventors: Man Chan, San Jose, CA (US); Abe Taha, Sunnyvale, CA (US); Kendra Mariko Chen, San Jose, CA (US); Guohan Gao, San Jose, CA (US); Aleksandar Mastilovic, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 1198 days.

(21) Appl. No.: 14/791,074

(22) Filed: Jul. 2, 2015

(65) Prior Publication Data

US 2016/0055540 A1 Feb. 25, 2016

Related U.S. Application Data

(60) Provisional application No. 62/040,185, filed on Aug. 21, 2014.

(51) Int. Cl.
*G06Q 30/02* (2012.01)
(52) U.S. Cl.
CPC ..... *G06Q 30/0269* (2013.01); *G06Q 30/0277* (2013.01)
(58) Field of Classification Search
None
See application file for complete search history.

(56) References Cited

U.S. PATENT DOCUMENTS

| 6,519,571 | B1 * | 2/2003 | Guheen | G06Q 30/02 705/14.66 |
| 6,868,437 | B1 * | 3/2005 | Gary | G06F 9/547 709/213 |
| 7,386,517 | B1 * | 6/2008 | Donner | G06Q 10/02 705/14.14 |

(Continued)

OTHER PUBLICATIONS

Butun, et al (A Survey of Intrusion Detection Systems in Wireless Sensor Networks) (Year: 2014).*

(Continued)

*Primary Examiner* — Mamon Obeid
(74) *Attorney, Agent, or Firm* — Kilpatrick Townsend & Stockton LLP

(57) ABSTRACT

A method, system, and computer program product for managing user identification codes in an internet advertising environment. One aspect implements a system including a database engine to store a plurality of signals comprising characteristics and/or values received from a user device. A user ID generator calculates collision statistics and/or fragmentation statistics to form a first mapping function that is in turn used to generate a plurality of identification codes based at least in part a first set of selected signals. A calibration module produces measurements determined from collision quantities and/or fragmentation quantities using the first mapping function, wherein the measurements are determined by comparing the plurality of identification codes to entries in a known ID database. A sequencing module generates updated sequences of mapping functions.

18 Claims, 28 Drawing Sheets

(56) References Cited

U.S. PATENT DOCUMENTS

| | | | |
|---|---|---|---|
| 7,986,695 B1* | 7/2011 | Kodeboyina | H04L 45/04 370/392 |
| 8,131,799 B2* | 3/2012 | Landsman | H04L 63/0407 709/203 |
| 8,527,347 B2* | 9/2013 | Pulijala | G06Q 30/0269 705/14.64 |
| 9,087,216 B2* | 7/2015 | LaFever | H04L 63/0414 |
| 9,270,650 B2* | 2/2016 | Johnsen | H04L 41/12 |
| 9,414,100 B2* | 8/2016 | Van Veldhuisen | H04N 21/23655 |
| 9,509,489 B1* | 11/2016 | Ibison | H04L 27/368 |
| 9,514,479 B2* | 12/2016 | Lauckhart | G06Q 30/02 |
| 10,044,654 B2* | 8/2018 | Papa | H04L 51/12 |
| 10,091,312 B1* | 10/2018 | Khanwalkar | H04L 67/22 |
| 10,148,792 B1* | 12/2018 | Van Staden | G06Q 30/0277 |
| 10,460,353 B2* | 10/2019 | Hsu | G06Q 30/0269 |
| 10,489,822 B2* | 11/2019 | Wiener | G06Q 30/0255 |
| 10,572,903 B2* | 2/2020 | Wiener | G06Q 30/0255 |
| 10,580,032 B2* | 3/2020 | Wiener | G06Q 30/0246 |
| 2002/0136183 A1* | 9/2002 | Chen | H04W 16/14 370/338 |
| 2003/0037108 A1* | 2/2003 | Peiffer | H04L 67/1027 709/203 |
| 2003/0158889 A1* | 8/2003 | Massarani | H04L 29/08846 709/203 |
| 2003/0188009 A1* | 10/2003 | Agarwalla | H04L 67/02 709/236 |
| 2004/0179547 A1* | 9/2004 | Kuffner | H04L 1/0025 370/465 |
| 2005/0280507 A1* | 12/2005 | Diorio | G06K 7/0008 340/10.1 |
| 2006/0071759 A1* | 4/2006 | Cooper | G06K 7/10297 340/10.2 |
| 2006/0241923 A1* | 10/2006 | Xu | G06K 9/6217 703/2 |
| 2008/0082381 A1* | 4/2008 | Muller | G06Q 10/10 705/344 |
| 2008/0150784 A1* | 6/2008 | Zhang | G01S 13/781 342/30 |
| 2008/0168103 A1 | 7/2008 | Rakic | |
| 2008/0266166 A1* | 10/2008 | Schuchman | G07C 5/008 342/37 |
| 2009/0150711 A1* | 6/2009 | Kami | G06F 11/008 714/1 |
| 2009/0171790 A1 | 7/2009 | Nagarajayya | |
| 2010/0057843 A1* | 3/2010 | Landsman | H04L 63/0876 709/203 |
| 2010/0278131 A1* | 11/2010 | Jeong | H04W 74/0858 370/329 |
| 2012/0215896 A1* | 8/2012 | Johannsen | H04L 41/0853 709/223 |
| 2012/0226111 A1* | 9/2012 | LeBoeuf | A61B 5/0022 600/301 |
| 2012/0323694 A1* | 12/2012 | Lita | G06F 7/00 705/14.66 |
| 2012/0324101 A1* | 12/2012 | Pecjack | G06Q 30/0201 709/224 |
| 2013/0124309 A1 | 5/2013 | Traasdahl et al. | |
| 2013/0154916 A1* | 6/2013 | Ramaswamy | G06Q 10/0633 345/156 |
| 2014/0032610 A1* | 1/2014 | Kemmler | G06F 16/213 707/803 |
| 2014/0129670 A1* | 5/2014 | Oliver | G06F 21/10 709/217 |
| 2014/0189498 A1* | 7/2014 | Liverant | G06F 16/95 715/234 |
| 2014/0281943 A1* | 9/2014 | Prilepov | G06F 40/242 715/257 |
| 2014/0324545 A1* | 10/2014 | Splaine | G06Q 30/0204 705/7.33 |
| 2014/0324575 A1* | 10/2014 | Haies | G06Q 30/0251 705/14.49 |
| 2014/0336788 A1* | 11/2014 | Paunonen | G05B 13/04 700/29 |
| 2014/0337104 A1* | 11/2014 | Splaine | G06Q 30/0204 705/7.33 |
| 2014/0358688 A1* | 12/2014 | Tuttle | G06Q 30/0267 705/14.64 |
| 2014/0372224 A1* | 12/2014 | Tawakol | H04L 29/0809 705/14.66 |
| 2014/0372225 A1* | 12/2014 | Tawakol | G06Q 30/0269 705/14.66 |
| 2015/0026330 A1* | 1/2015 | Ahmed | H04W 4/10 709/224 |
| 2015/0165937 A1* | 6/2015 | Harda | B60N 2/42 701/45 |
| 2015/0270930 A1* | 9/2015 | Luby | H04L 67/02 714/751 |
| 2015/0334760 A1* | 11/2015 | Sartori | H04L 43/08 370/329 |
| 2016/0027006 A1* | 1/2016 | Billett, Jr. | G07F 19/20 705/71 |
| 2016/0055540 A1* | 2/2016 | Chan | G06Q 30/0269 705/14.66 |
| 2016/0055546 A1* | 2/2016 | Chan | G06Q 30/0277 705/14.73 |
| 2016/0132938 A1* | 5/2016 | Wiener | G06Q 30/0269 705/14.66 |
| 2016/0189237 A1* | 6/2016 | Marlin | H04L 67/02 705/14.52 |
| 2017/0039242 A1* | 2/2017 | Milton | G06Q 30/0269 |
| 2017/0180797 A1* | 6/2017 | Splaine | H04L 67/22 |
| 2017/0262885 A1* | 9/2017 | Fuentes | G06Q 30/0269 |
| 2017/0278084 A1* | 9/2017 | Kumra | G06Q 20/405 |
| 2018/0018714 A1* | 1/2018 | Uhalley | G06Q 30/0248 |
| 2018/0109298 A1* | 4/2018 | Elsherif | H04W 74/0816 |
| 2018/0315060 A1* | 11/2018 | Sheppard | G06F 16/00 |
| 2020/0202102 A1* | 6/2020 | Chan | G06F 16/9014 |

OTHER PUBLICATIONS

Eckersley, P., "Browser Versions Carry 10.5 Bits of Identifying Information on Average", Electronic Frontier Foundation, dated Jan. 27, 2010, 4 pages.

"Is it possible to defend against browser fingerprinting?" Panopticlick, Jan. 11, 2013, 2 pages.

Eckersley, P., "How Unique Is Your Web Browser?", Electronic Frontier Foundation, 2010, 19 pages.

Nakamot; Satoshi, "Bitcoin: A Peer-to-Peer Electronic Cash System", retrieved from: https://bitcoin.org/bitcoin.pdf, 2009, pp. 1-9, Oct. 2008.

U.S. Appl. No. 14/791,105, First Action Interview Pilot Program Pre-Interview Communication dated Feb. 15, 2019, 4 pages.

U.S. Appl. No. 14/791,105, Final Office Action dated Sep. 23, 2019, 29 pages.

U.S. Appl. No. 14/791,105 received a Non-Final Office Action dated Sep. 4, 2020, 33 pages.

* cited by examiner

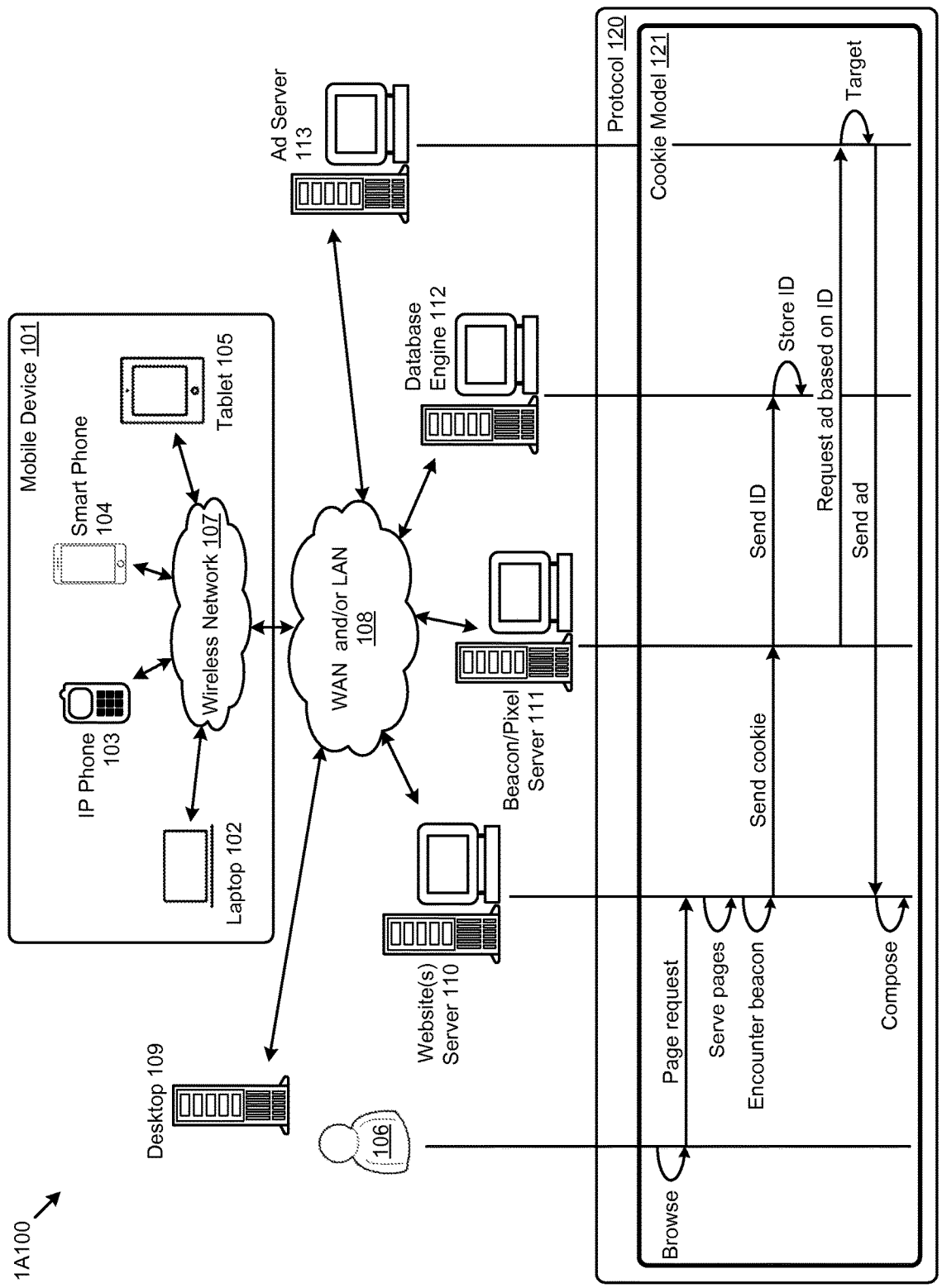
FIG. 1A1

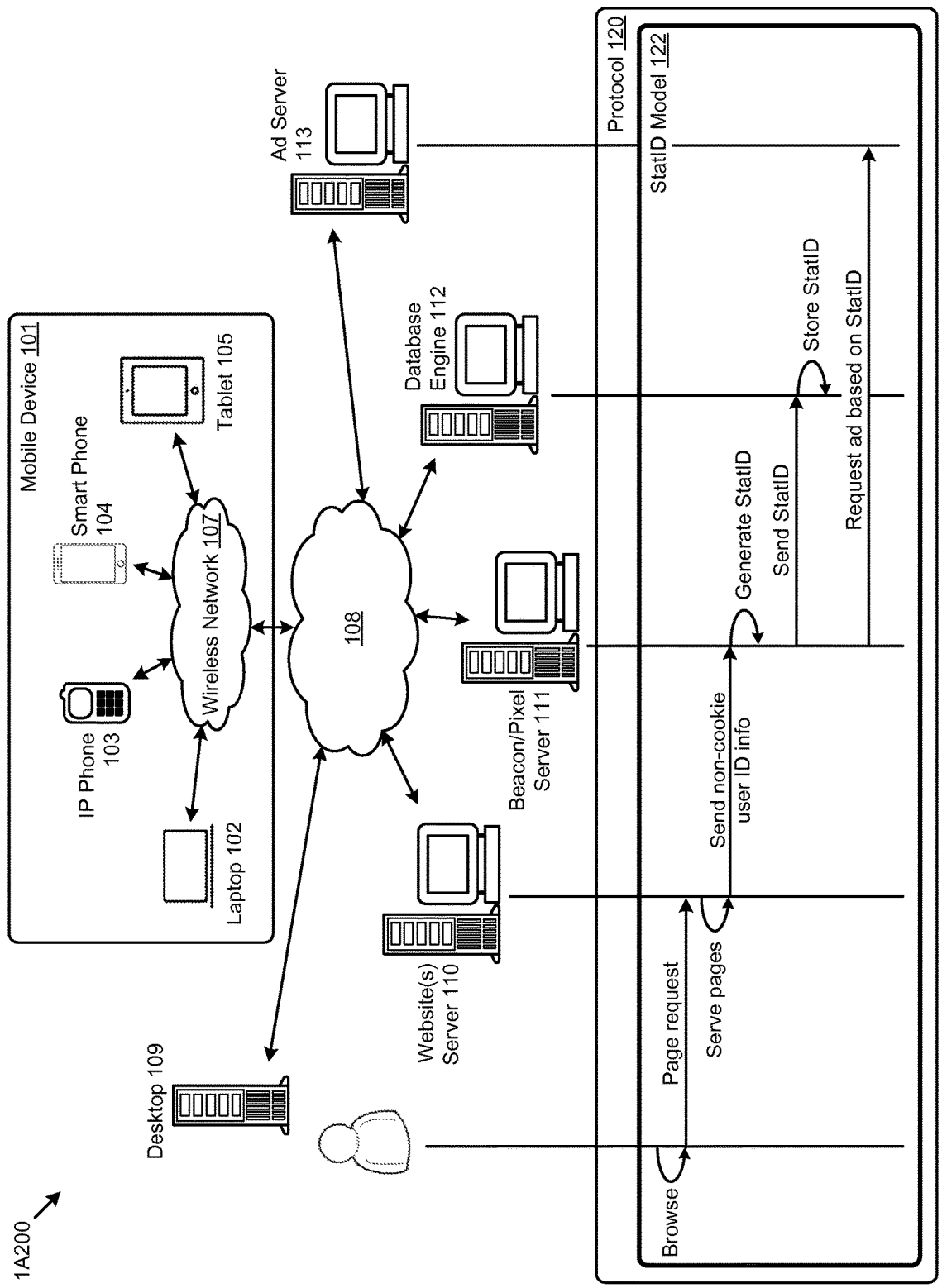
FIG. 1A2

User-Agent=Mozilla/5.0 (Android; Tablet; rv:21.0) Gecko/21.0 Firefox/21.0
ip=70.1.2.3
DEVICE-ID=MDrjZNeSwYOh/5

User-Agent=Mozilla/4.0 (compatible; MSIE 8.0; Windows NT 6.1; WOW64; Trident/4.0; BTRS4420; chromeframe/29.0.1547.66; SLCC2; .NET CLR 2.0.50727; .NET CLR 3.5.30729; .NET CLR 3.0.30729; Media Center PC 6.0; InfoPath.3; MS-RTC LM 8; .NET4.0C)
ip=70.4.5.6
DEVICE-ID=wUH2qLDzAC4pY

User-Agent=Mozilla/5.0 (iPhone; CPU iPhone OS 6_1_3 like Mac OS X) AppleWebKit/536.26 (KHTML, like Gecko) Mobile/10B329 [FBAN/FBIOS;FBAV/6.4;FBBV/290891;FBDV/iPhone4,1;FBMD/iPhone;FBSN/iPhone OS;FBSV/6.1.3;FBSS/2; FBCR/Verizon;FBID/phone;FBLC/en_US;FBOP/1]
ip=174.7.8.9
DEVICE-ID=/QRrgt7e
Time=768102432, 8001120532, 1680105024
Timezone=420
Plugins (hashed)=20aec242, 1dc26e73
Mime Types (hashed)=c56ef98, 7df23a0

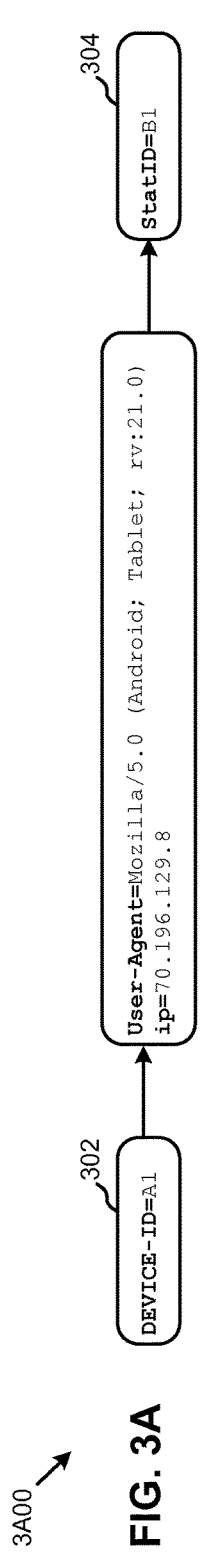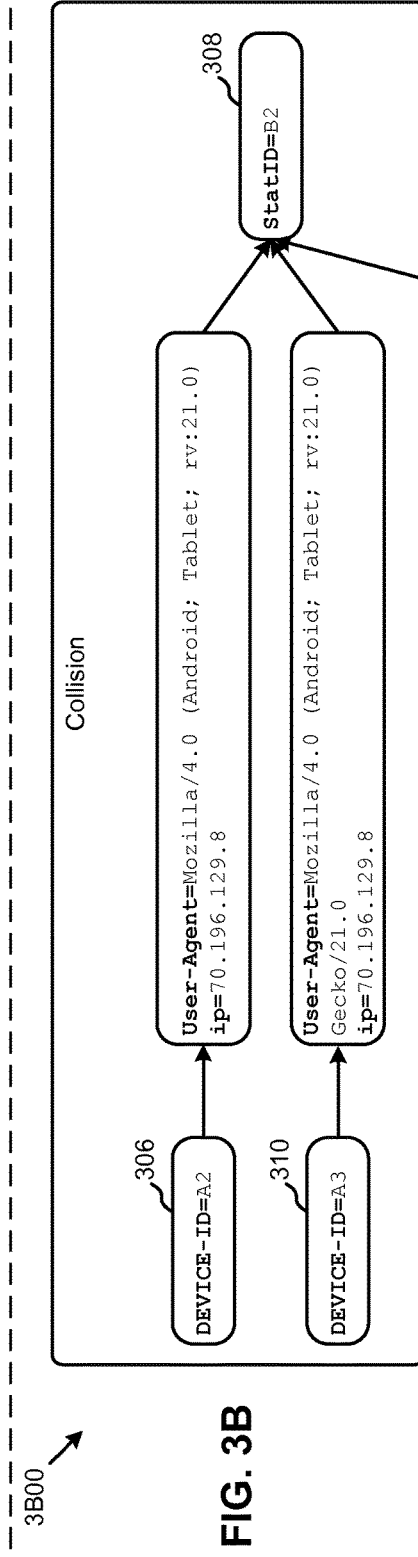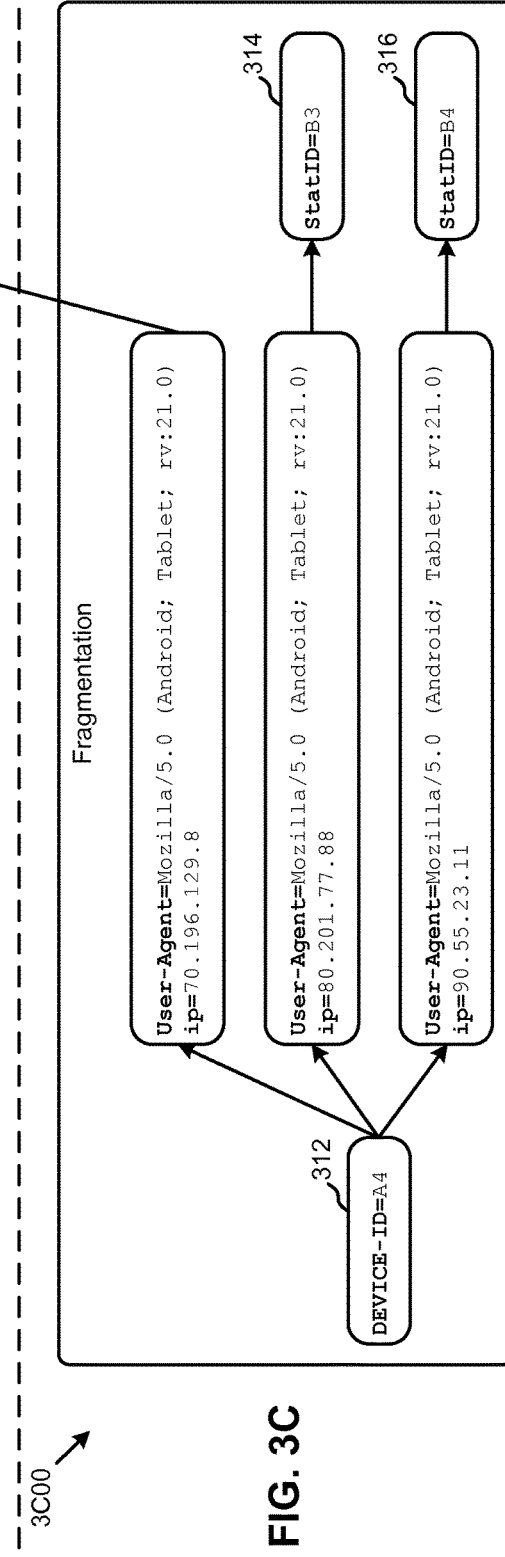

| StatID | B1 | B2 | B3 | B4 | Fragmentation Statistic 404 |
|---|---|---|---|---|---|
| X-UIDH | | | | | |
| A1 | 1 | 0 | 0 | 0 | 1 |
| A2 | 0 | 1 | 0 | 0 | 1 |
| A3 | 0 | 1 | 0 | 0 | 1 |
| A4 | 0 | 0 | 1 | 1 | 2 |
| Collision Statistic 405 | 1 | 2 | 1 | 1 | |

A2 and A3 collide to B2 402

A4 is fragmented to B3 and B4 406

FIG. 4

| StatId | Mozilla | iPhone | ios | Android | OS | US |
|--------|---------|--------|-----|---------|-----|-----|
| S1 | 1 | 1 | 1 | 0 | 0 | 1 |
| S2 | 1 | 1 | 1 | 0 | 1 | 0 |
| S3 | 1 | 0 | 0 | 1 | 1 | 1 |
| S4 | 1 | 0 | 0 | 1 | 1 | 0 |
|    | 0 | 0 | 0 | 0 | 1 | 2 |

In this sample, all users use "Mozilla", so Mozilla is not helpful to discriminate between one user and another user 502

6 bits

4 IDs (requires 2 bits id)

| | Nx | Ny | F | C | avgF | avgC |
|---|---|---|---|---|---|---|
| 3 Octet + UA sidv11_validate_de | 19,302,975 | 2,690,922 | 0.46 | 0.35 | 3.11 | 38.76 |
| IOSAPP | 6,591,686 | | 0.36 | 0.38 | 2.8 | 43 |
| IOSWEB | 4,127,215 | 211,732 | 0.24 | 0.39 | 2.51 | 63.36 |
| ANDAPP | 380,022 | 160,450 | 0.27 | 0.26 | 2.67 | 10.06 |
| ANDWEB | 8,736,958 | 709,661 | 0.3 | 0.43 | 3.12 | 52.35 |
| OTHER | 1,597,460 | 1,002,661 | 0.49 | 0.25 | 3.67 | 11.57 |
| BRIDGE_IOS | 1,430,025 | 444,983 | 0.87 | 0.3 | 3.09 | 27.48 |
| BRIDGE_AND | 208,378 | 238,659 | 0.32 | 0.32 | 4.33 | 8.55 |
| 0.0.0.0 Octet + UA sidv11_validate_ua | 19,302,975 | 110,281 | 0.09 | 0.35 | 2.25 | 546.62 |
| IOSAPP | 6,591,686 | 12,906 | 0.36 | 0.36 | 2.07 | 1002.83 |
| IOSWEB | 4,127,215 | 1,154 | 0.01 | 0.68 | 2.03 | 5319.06 |
| ANDAPP | 380,022 | 7,046 | 0.01 | 0.45 | 2.05 | 120.39 |
| ANDWEB | 8,736,958 | 9,467 | 0.02 | 0.6 | 2.06 | 1585.8 |
| OTHER | 1,597,460 | 81,493 | 0.2 | 0.28 | 2.53 | 86.8 |
| BRIDGE_IOS | 1,430,025 | 16,340 | 0.32 | 0.46 | 2.2 | 261.95 |
| BRIDGE_AND | 208,378 | | 0.29 | 0.43 | 2.28 | 71.85 |
| 3.5 Octet + UA sidv11_validate_us | 19,302,975 | 5,031,880 | 0.44 | 0.31 | 3.14 | 21.68 |
| IOSAPP | 6,591,686 | 525,438 | 0.36 | 0.3 | 2.84 | 30.25 |
| IOSWEB | 4,127,215 | 180,974 | 0.24 | 0.46 | 2.56 | 22.45 |
| ANDAPP | 380,022 | | 0.27 | 0.19 | 2.74 | 12.06 |
| ANDWEB | 8,736,958 | 1,654,705 | 0.49 | 0.45 | 3.13 | 22.52 |
| OTHER | 1,597,460 | 1,941,009 | 0.5 | 0.22 | 3.88 | 5.62 |
| BRIDGE_IOS | 1,430,025 | 697,264 | 0.86 | 0.29 | 3.11 | 17.01 |
| BRIDGE_AND | 208,378 | 208,946 | 0.89 | 0.2 | 3.96 | 8.46 |

Known unique users 660
Generated StatIDs 662
Relates to quality vis-à-vis fragmentation 664
Relates to quality of compression 666

| StatId | Mozilla | iPhone | ios | Android | Linux | Mobile |
|---|---|---|---|---|---|---|
| S1 | 1 | 0 | 0 | 0 | 0 | 1 |
| S2 | 1 | 0 | 0 | 0 | 1 | 0 |
| S3 | 1 | 0 | 0 | 1 | 1 | 1 |
| S4 | 1 | 0 | 0 | 1 | 1 | 0 |
|    | 0 | 0 | 0 | 0 | 1 | 2 |

Matrix for tuning StatID generation function to a particular device 806

Offending feature 806 iOS Map 803
Android Map 805

Device #1: S1, S2
Device #2: S3, S4

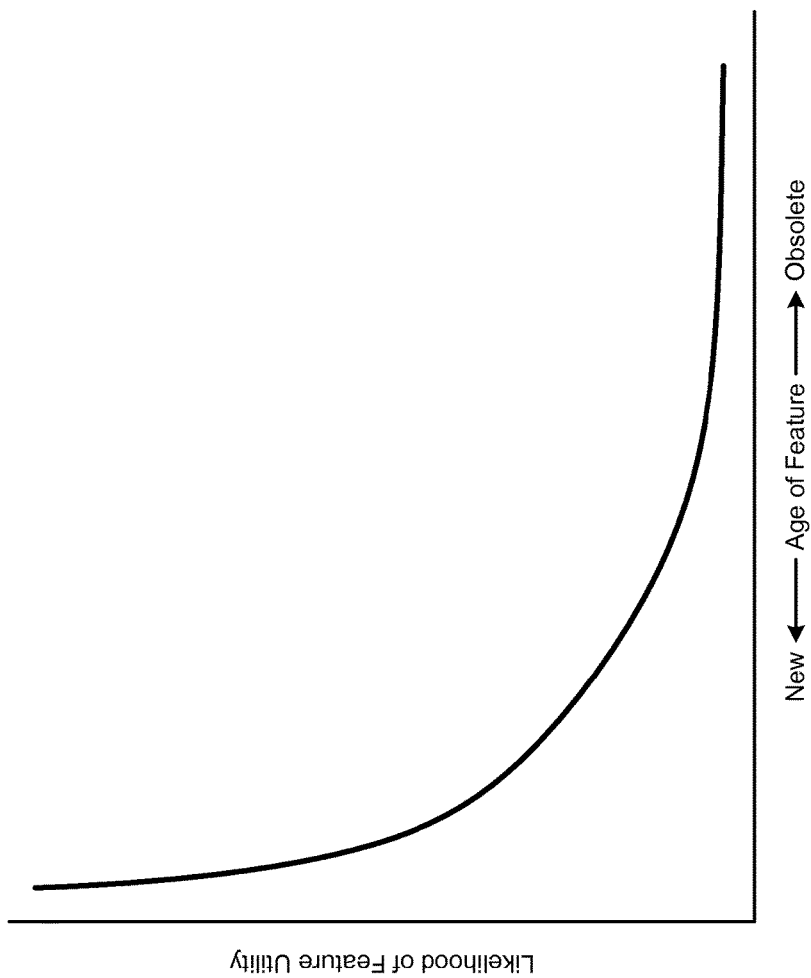

TUNABLE STATISTICAL IDS

RELATED APPLICATIONS

The present application claims the benefit of priority to U.S. Provisional Patent Application Ser. No. 62/040,185, entitled "MANAGING TUNABLE PROGRESSIVE STATISTICAL IDS", filed Aug. 21, 2014; which is hereby incorporated by reference in its entirety.

The present application is related to co-pending U.S. patent application Ser. No. 14/791,105, entitled "MANAGING PROGRESSIVE STATISTICAL IDS", filed on even date herewith, which is hereby incorporated by reference in its entirety.

FIELD

This disclosure relates to the field of managing user identification codes in an internet advertising environment and more particularly to techniques for generating tunable statistical user identification codes.

BACKGROUND

In order to track user browsing behavior, a website developer puts a unique identifier in a browser cookie to identify a visiting browser. In some cases, use of cookies is not supported (e.g., for some mobile devices), and/or is sometimes disallowed or blocked (e.g., in some versions of Mozilla), or restricted (e.g., to comply with changing privacy standards). Furthermore, with the advent of new rules and regulations (e.g., privacy rules, privacy policies), browser developers have begun to eschew storing 3rd party cookies when a user visits a web page from a first party. Usually a first party web page will include a hidden pixel from a third party website so that the third party can provide additional information to the first party website. Because of the declining frequency of the practice of using third-party cookies, and/or the inability or inconvenience of storing information as a third party cookie, third party websites cannot reliably and uniquely identify a browser using cookie. A third party website needs to use a different (e.g., cookie-less) method to identify a browser or browser-like agent.

Unfortunately, many mobile devices and mobile device applications do not support cookies, and indeed, might not support a given particular browser. A different, non-cookie way of identifying a user is needed. One possibility is to use an identifier that exhibits at least a statistical likelihood of corresponding to a user. Unfortunately, a statistical ID (statid or StatID for short) is not necessarily unique to a particular user. This can occur, for example, when multiple browsers from different installations cause generation of the same StatID. In the case that particular StatID is not unique to a user, it cannot be used to unambiguously identify a single unique browser instance or single unique user. An additional challenge of managing StatIDs is trying to generate an identifier as accurate as it can be (e.g., so as to make it more reliable to identify a browser instance or user accurately) yet without generating large numbers of StatIDs that refer to the same user.

When mapping user-related information (e.g., a browser header) to a StatID, there can be collisions such as when two sets of user-related information (e.g., profiles) become assigned to the same StatID. Collisions are desired to be minimized (or at least reduced to an acceptable level) since a collision means that two devices might be regarded as the same user (even if this is not true). At the same time fragmentation is to be minimized since, for example, a single browser being used by the same user might be fragmented into two different users, even though actions of the same user might have precipitated the generation of both (fragmented) StatIDs.

Techniques are needed to address the problem of how to tune statistical user identification codes with a known degree of accuracy and confidence. None of the aforementioned legacy approaches achieve the capabilities of the herein-disclosed techniques for tuning the generation or mapping functions for statistical user identification codes. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for tunable progressive statistical user identification codes. The claimed embodiments address the problem of how to generate statistical user identification codes with high quality characteristics. Some claims are directed to approaches for providing a rotating series of individually-tuned hash functions, which claims advance the technical fields for addressing the problem of how to generate statistical user identification codes with high confidence, as well as advancing peripheral technical fields. Some claims improve the functioning of multiple systems within the disclosed environments.

One aspect implements a system for generating user identification codes, the system including a database engine to store a plurality of signals comprising characteristics and values received from a user device (e.g., wherein the characteristics and values are based at least in part on a user interaction with the user device); a user ID generator to calculate collision statistics and fragmentation statistics to form a first mapping function that is in turn used to generate a plurality of identification codes based at least in part a first set of selected signals; and a calibration module to produce measurements determined from collision quantities and fragmentation quantities using the first mapping function, wherein the measurements are determined by comparing the plurality of identification codes to entries in a known ID database.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1A1 and FIG. 1A2 exemplify environments that are suited for implementation of tunable progressive statistical user identification codes, according to some embodiments.

FIG. 2A, FIG. 2B and FIG. 2C show possible instances of signal logs used in the generation of tunable progressive statistical user identification codes, according to some embodiments.

FIG. 3A, FIG. 3B and FIG. 3C show collision and fragmentation cases based on signal logs, as used in the generation of tunable progressive statistical user identification codes, according to some embodiments.

FIG. 4 depicts an ID mapping matrix as used in the generation of tunable progressive statistical user identification codes, according to some embodiments.

FIG. 5 depicts a feature mapping matrix as used in the generation of tunable progressive statistical user identification codes, according to some embodiments.

FIG. 6C depicts a model performance breakdown chart as used for evaluating metrics in a system for generating tunable progressive statistical user identification codes, according to some embodiments.

FIG. 8A depicts a feature mapping matrix having an offending feature as used in the generation of tunable progressive statistical user identification codes, according to some embodiments.

FIG. 9A is a chart depicting a declining value of the utility of a feature through the progression of time, according to some embodiments.

DETAILED DESCRIPTION

Figure 1B:
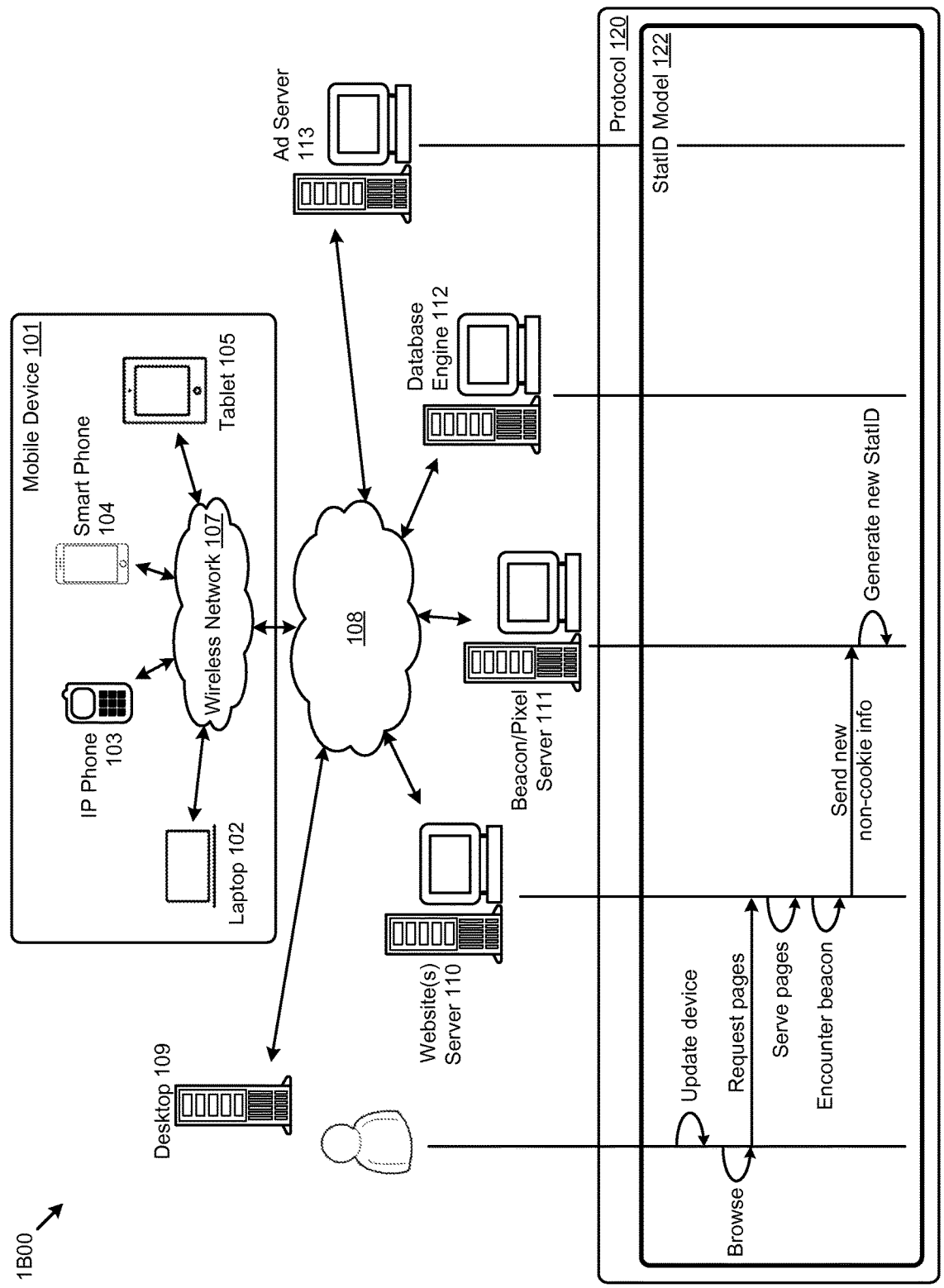
FIG. 1B exemplifies an environment suited for generation of tunable progressive statistical user identification codes, according to some embodiments.

Some embodiments of the present disclosure address the problem of how to generate statistical user identification codes with high confidence and some embodiments are directed to approaches for providing a rotating series of individually-tuned mapping functions. More particularly, disclosed herein and in the accompanying figures are exemplary environments, methods, and systems for tunable progressive statistical user identification codes.

OVERVIEW

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A1 and FIG. 1A2 exemplify environment 1A100 and environment 1A200 respectively that are suited for implementation of tunable progressive statistical user identification codes.

As shown in FIG. 1A1, the environment hosts mobile devices 101 (e.g., laptop 102, an IP phone 103, a smart phone 104, and a tablet 105) connected to a wireless network 107, which can serve as a link in a wide area network or local area network (e.g., network 108) to which a variety of servers as well as a desktop 109 can be connected. Any of the foregoing can be operated by a user 106.

In the cookie model 121 as shown, the user would browse web pages. A website server 110 serves pages, some of which pages contain a pixel beacon, which can be configured to engage in a protocol 120 with a beacon/pixel server 111. The beacon/pixel server might be configured to receive a cookie from a user's machine (e.g., in the case of a desktop). In such a case, the user cookie is sent to a database engine and the characteristics of the user as may be coded into the cookie and stored (e.g., see database engine 112). An ad server 113 might recognize that the cookie refers to a user having certain targeted demographics, and the ad server might send an advertisement to be composed onto a web page and presented to the user. Given a statistical ID of the form described herein, an ad server 113 might recognize that the statistical ID refers to a targeted user having certain targeted demographics, and, based on the demographics that derive from the statistical ID, the ad server might send an advertisement to be composed onto a web page and presented to the targeted user.

In the StatID model 122, when the website server 110 serves web pages, the beacon/pixel server might be able to receive only some characteristics from, for example, a browser header. A StatID is generated, and the generated StatID is sent to the database engine to be stored. The beacon/pixel server might request an advertisement based on the StatID and any information that is associated with that StatID.

Browser Header (Http Header)

For every browser-based visit to a website, a browser will send a request header called "http header". This header contains a quantum of information about the browser (e.g., time of visit, browser name and version, device characteristics, IP address, etc.). The beacon/pixel server (or any other server) considers the information from the header as a composition of keywords, called "features" (e.g., IP address, user agent string, etc.). Some keywords are relatively invariant with time (e.g., device type) and some features are more dynamic and/or are rapidly changing with time (e.g., timestamp and IP address). In total, considering all the browsing devices on the Internet, there are a fixed amount of stable keywords. Stable keywords are collected and a dictionary can be created. A selection of features to be used in generation of a StatID (e.g., via a hashing function) is called a "model".

By defining a hash function based on the keywords from the http header, this embodiment generates a 64-bit hash code to be used as a StatID. The challenges of making it usable includes selecting features (e.g., keywords) from each http header and applying the hash function. The selection of features to use has an impact on various measurable characteristics of a StatID. For example, in the case of using all known features to generate the hash code, every change in an IP or user agent string will generate a different StatID even though it is coming from the same browser, and possibly the same user. This phenomenon is called "fragmentation". On the other hand, restricting the hashing function to only use a small set of feature keywords may result in compression (e.g., where too many unique profiles are mapped to a single StatID). This phenomenon is termed a "collision". Exemplary implementations seek to keep both fragmentation and collision low so that a system can identify many browsers reliably while, at the same time, without generating too many fragmented StatIDs for a single browser.

As can be appreciated, fragmentation and collisions are two competing criteria. In one aspect, a process analyzes empirical data so as to choose a set of keywords that has the right amount of fragmentation and collision. In one implementation a process assigns each keyword a unique code (e.g., a ucode) and maintains such an assignment (e.g., in a ucode dictionary). Once a ucode is assigned to a keyword the assignment does not vary over time. The value of ucodes are to provide input to the hash function to generate the final hash code as a StatID. A collection of all keywords encountered becomes a master dictionary or master model. Some embodiments select keywords from a master model to form a keyword subset as a functional model based on the empirical data and deterministic criteria. Keywords that do not appear in the functional model will not be used in the hash code generation, only those keywords in the functional model will be used to generate the final hash code, i.e., statistical ID.

Whenever a new keyword is observed from the Internet (e.g., from log files), the master model is updated by adding the new keywords and ucodes while keeping the existing keywords and ucodes unchanged. Therefore, whenever a new functional model is created, the same code for the same keyword is maintained. As long as a browser sends the http header with the recognized keywords in the functional model, the same StatID will be generated. This way the same StatID for the browser through model update or software upgrade can be maintained. One case where the new functional model generates a different StatID for the same browser occurs when the new functional model contains new keywords (or in the case that keywords have been removed). This technique is referred to as "progressive" StatID generation. The progressive property supports tuning StatID performance continuously to both cater for changes in the business climate while maintaining a continuous tracking ability of the StatIDs. The aspect of creating a functional model from a master model such that the accuracy of StatID generation can be controlled over a progression of time is further discussed in the following paragraph and in other places below.

One embodiment operates as follows: For every update or upgrade, the process will determine the differences in keywords between the 'old' functional model and the 'new' functional model. This set of differences is called a "difference set". Only those browsers that have the keywords belonging to the difference set will have a different generated StatID in the new model, as comparing to the old model. However, if a browser has no keywords in the difference set, their StatID will remain the same. In order to reduce the impact of changing many StatIDs in this embodiment, a carefully constructed functional model is generated such that only a small fraction of browsers will be affected. This concept is used in progressive StatID generation techniques.

Another embodiment tunes the accuracy of the StatID based on choosing a trade-off point between fragmentation and collision for each device or geo-location. Since most keywords are distinct for each device and its IP range can indicate the geographical location (country level), The StatID performance can be independently controlled by generating different functional models for different combinations of devices and geo-location. This concept is used in tunable StatID generation techniques.

In yet another aspect, a systematic procedure to tune the performance of the StatID is disclosed. In a theoretical case, if every website can interact with every browser on the Internet, then theoretically, there exists one universal optimal statistical ID. However, in the empirical cases, the browser data encountered by each website are different as different businesses attract different users; therefore, there is no one single most optimal statistical ID for all cases.

What is desired is to have the ability to tune the performance of a statistical ID such that one business can tune its statistical ID according to one's unique business tradeoffs. The disclosed techniques and processes facilitate an operator to tune its statistical ID generation by trading off collision and fragmentation to achieve a total number of statistically measurable and unique StatID.

One possible environment for managing tradeoffs when generating StatIDs is shown in FIG. 1B.

FIG. 1B exemplifies an environment 1B00 suited for generation of tunable progressive statistical user identification codes, which can be used in any context, including uses to extend or replace uses of user IDs in the disclosed systems. As used herein, a user ID can be any unique identifier that can be used to access aspects of that user. Strictly as examples, a user ID can be a name or an email alias, or a hashed email alias, or a device ID that corresponds to a device used by a user, or a pointer, or an identifier that is formed from a collection of attributes ascribed to a particular user. A user ID can be generated by the user, or can be provided by a third-party or can be formed using any one or more algorithms. A user ID can refer uniquely to a particular individual. In some situations, a user ID can refer to a set of users that share one or more user attributes (e.g., demographics or interests).

As shown in FIG. 1B, a user 106 updates the user's mobile device (e.g., buys a new device or advances to a new software load). The website server serves pages, which in turn will encounter a beacon, and new non-cookie information is sent to the beacon/pixel server. A new StatID is generated. The specific nature of the new StatID and its generation are the subject of the following figures and descriptions.

Figure 1C:
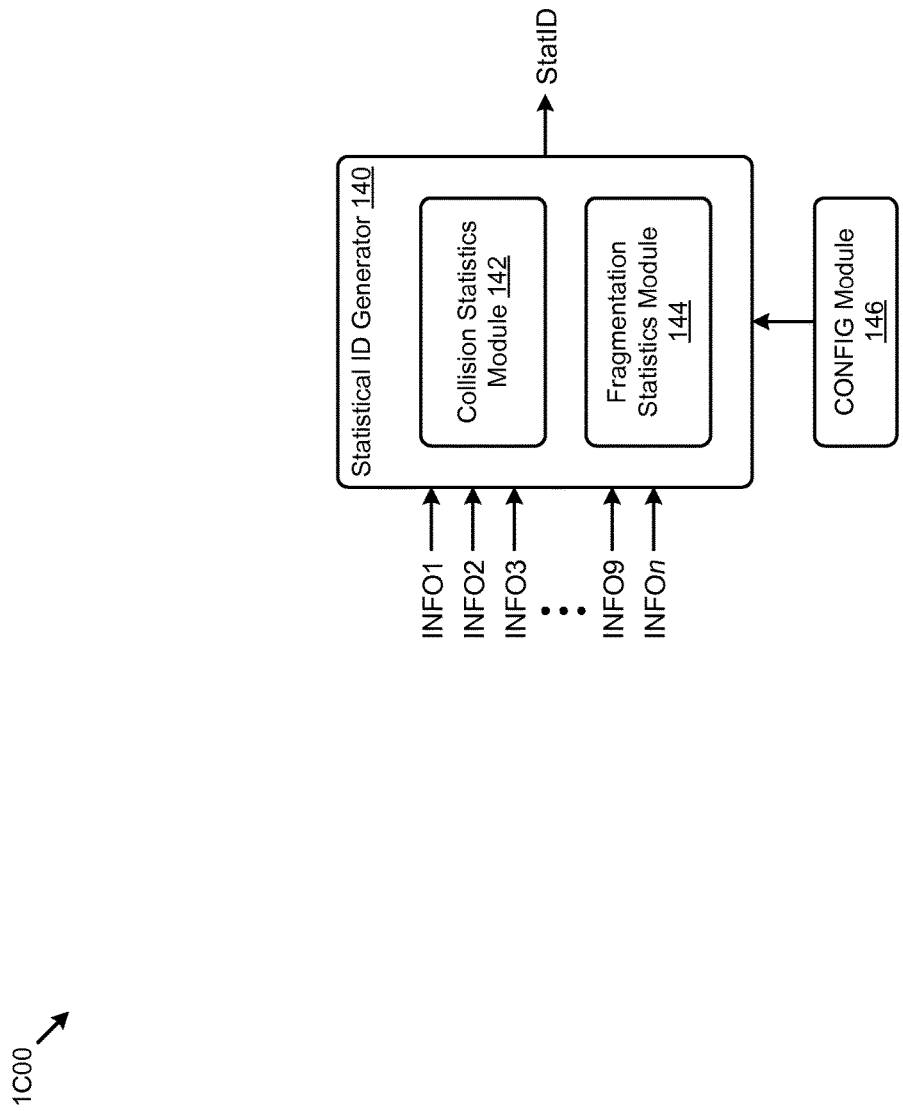
FIG. 1C shows a data flow including configuration and generation of tunable progressive statistical user identification codes, according to some embodiments.

FIG. 1C shows a data flow 1C00 including configuration and generation of tunable progressive statistical user identification codes. As an option, one or more instances of data flow 1C00 or any aspect thereof may be implemented in the context of the architecture and functionality of the embodiments described herein. Also, the data flow 1C00 or any aspect thereof may be implemented in any desired environment.

As shown in FIG. 1C, the data flow comprises an input set 148 that serves as inputs to a statistical ID generator 140. Inputs include non-cookie information (e.g., INFO1, INFO2, INFO3 . . . INFO9 thru INFOn) and a configuration module (e.g., configuration module 146). Shown outputs include a StatID.

The statistical ID generator (e.g., a user id generator) includes a collision statistics module 142 and a fragmentation statistics module 144). An operator can provide a set of non-cookie information and a set of configuration parameters, and analyze collision statistics and fragmentation statistics in order to change the inputs and/or configuration parameters. In some cases a calibration module is provided, and an operator can change the inputs and/or configuration parameters based on statistics from the calibration module.

Figure 1D:
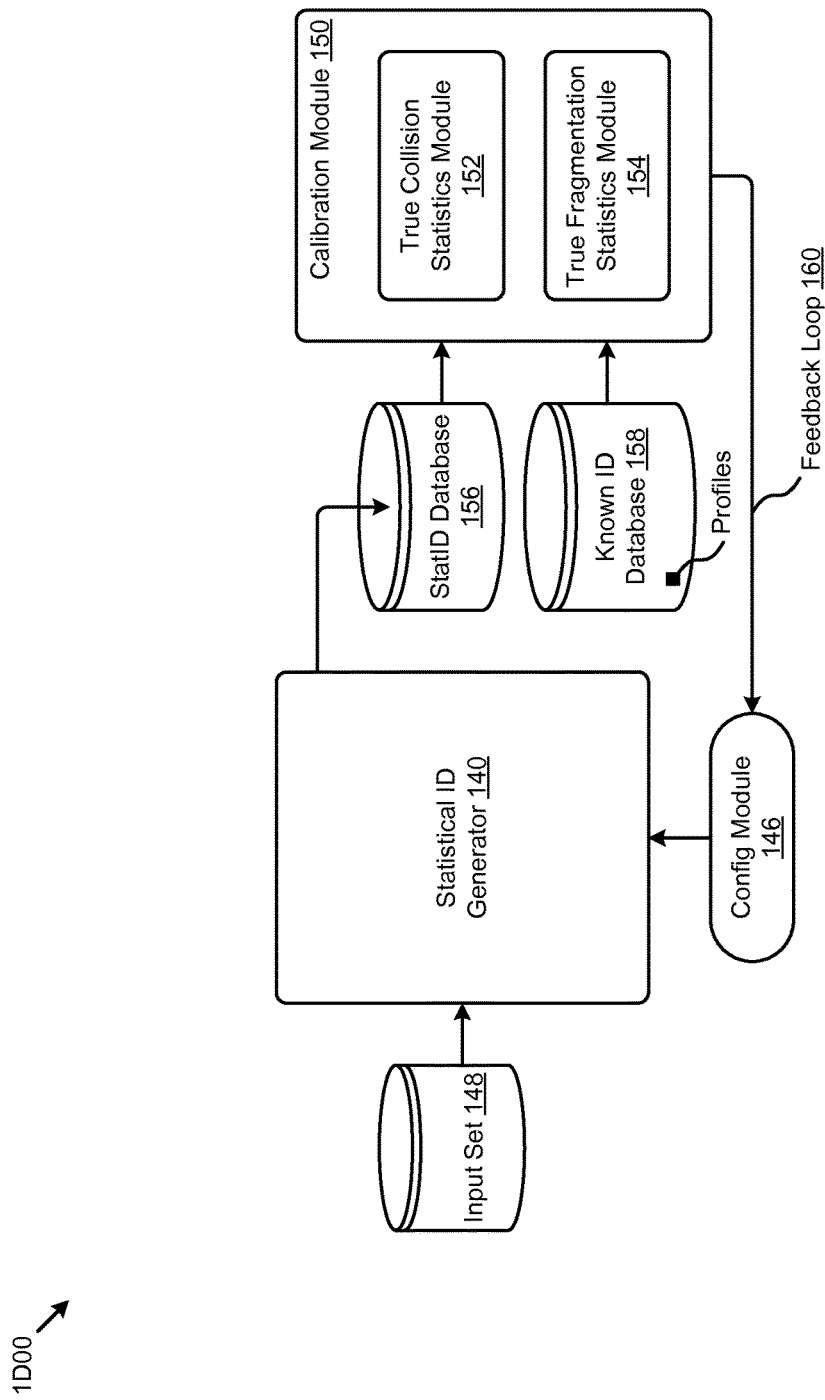
FIG. 1D shows a possible instance of a feedback loop for generation of tunable progressive statistical user identification codes, according to some embodiments.

FIG. 1D shows a possible instance of a feedback system 1D00 for generation of tunable progressive statistical user identification codes. As an option, one or more instances of feedback system 1D00 or any aspect thereof may be implemented in the context of the architecture and functionality of the embodiments described herein. Also, the feedback system 1D00 or any aspect thereof may be implemented in any desired environment.

As shown in FIG. 1D, the feedback loop 160 comprises a loop back from an output of the calibration module 150 to a configuration module (e.g., configuration module 146). The calibration module takes in inputs in the form of generated StatIDs (e.g., from StatID database 156) and a set of database entries corresponding to known profiles (e.g., from known ID database 158). The calibration module can calculate true collision statistics from the true collision statistics module 152 as well as calculate true fragmentation statistics from the true fragmentation statistics module 154 so as to calibrate the configuration and/or other aspects of the statistical ID generation module. A statistical ID generation module, or any other module, can calculate collision statistics that indicate how many characteristics, or what set of characteristics are expected to be associated with different users. For example, one statistical identification code generator can use a set of characteristics to generate a code that would be undistinguished from a large number of known users (e.g., exhibiting a high likelihood of collisions), while a different statistical identification code generator can use a different set of characteristics to generate a code that would be distinguished from nearly all known users (e.g., exhibiting a low likelihood of collisions).

Further details regarding general approaches to user profiles are described in U.S. Application Ser. No. 62/040,197, titled "A MULTI-TIER REGIME FOR CREATING AND MANAGING ONLINE USER PROFILES" filed on Aug. 21, 2014, which is hereby incorporated by reference in its entirety.

Further details regarding general approaches to generation of user identification codes are described in U.S. application Ser. No. 13/918,091 titled "MULTI-PROFILE TRACKING IDENTIFICATION OF A MOBILE USER" filed on Jun. 14, 2013, which is hereby incorporated by reference in its entirety.

The non-cookie information comprises browser headers and other data collected by the beacon/pixel server.

FIG. 2A through FIG. 2C shows possible instances of signal logs 2A00, signal logs 2B00 and signal logs 2C00 used in the generation of tunable progressive statistical user identification codes. As an option, one or more instances of signal logs 2A00, signal logs 2B00 and signal logs 2C00 or any aspect thereof may be implemented in the context of the architecture and functionality of the embodiments described herein. Also, the signal logs 2A00, signal logs 2B00 and signal logs 2C00 or any aspect thereof may be implemented in any desired environment.

As shown in FIG. 2A, FIG. 2B and FIG. 2C, the signal logs comprise an Internet Protocol (IP) address (e.g., IP address), a user-agent string (UA) and other HTTP information. Some of the information in the http header is human-readable, and some of it is encoded. Either species (e.g., human readable information and/or encoded information) can be logged. Either species can be included in the ucode dictionary. The examples shown and discussed as pertaining to FIG. 2A and FIG. 2B are merely subsets of signals. Such subsets can be relatively smaller or relatively larger, for example, and as shown in FIG. 2C. The signals can comprise a time indication, a time zone indication, a plug-in indication, and a MIME TYPE indication, and/or any other signal indications and/or signal values. Any signal indications and/or signal values can originate from a user's platform (e.g., mobile device, software version, browser, etc.) or network.

FIG. 3A, FIG. 3B and FIG. 3C show collision and fragmentation cases based on signal logs, as used in the generation of tunable progressive statistical user identification codes. As an option, one or more instances of collision and fragmentation cases based on the signal logs 3A00, signal logs 3B00, and signal logs 3C00 or any aspect thereof may be implemented in the context of the architecture and functionality of the embodiments described herein. Also, the collision and fragmentation cases based on the signal logs 3A00, signal logs 3B00, and signal logs 3C00 or any aspect thereof may be implemented in any desired environment.

As shown in FIG. 3A through FIG. 3C, the collision and fragmentation cases based on the signal logs of FIG. 2A through FIG. 2C comprises three examples. First, a newly-encountered DEVICE-ID (e.g., A1 302) is mapped to a new StatID (e.g., B1 304). Second, a collision operation based upon an incoming pair of DEVICE-ID (e.g., A2 306 and A3 310) is mapped to the same StatID (e.g., B2 308). Third, a fragmentation operation based on one incoming X_UIDH (e.g., A4 312) is mapped to three StatIDs (e.g., B2 308, B3 314, and B4 316).

FIG. 4 depicts an ID mapping matrix 400 as used in the generation of tunable progressive statistical user identification codes. As an option, one or more instances of ID mapping matrix 400 or any aspect thereof may be implemented in the context of the architecture and functionality of the embodiments described herein. Also, the ID mapping matrix 400 or any aspect thereof may be implemented in any desired environment.

As shown in FIG. 4, the ID mapping matrix comprises rows of DEVICE-ID values (e.g., A1, A2, A3, A4, as shown), and columns of StatIDs (e.g., B1, B2, B3, and B4, as shown). The value in a cell of the matrix refers to a mapping. As shown, A2 and A3 collide since they both map to B2 402 (also see collision statistic 405). Also as shown, A4 is fragmented since it is mapped to both B3 and B4 406 (also see fragmentation statistic 404).

A metric (e.g., in equation form) for collisions and fragmentations are given by:

$$Collsion = \frac{N(c > 1)}{N(c = *)} \quad \text{(Eq. 1)}$$

$$Fragmentation = \frac{N(f > 1)}{N(f = *)} \quad \text{(Eq. 2)}$$

FIG. 5 depicts a feature mapping matrix 500 as used in the generation of tunable progressive statistical user identification codes. As an option, one or more instances of feature mapping matrix 500 or any aspect thereof may be implemented in the context of the architecture and functionality of the embodiments described herein. Also, the feature mapping matrix 500 or any aspect thereof may be implemented in any desired environment.

As shown in FIG. 5, the feature mapping matrix comprises a set of features (e.g., "Mozilla", "iPhone", "iOS", "Android", "OS", and "US"). The StatIDs shown at the left (e.g., S1, S2, S3, and S4) are values comprised of the existence or absence of a particular feature.

In some cases the aforementioned value can be constructed by a concatenation of features. In some cases, the feature of an IP address or portion thereof serves to discriminate between two StatIDs that would otherwise collide:

$$Word = \{User\ Agent, IP\} \quad \text{(Eq. 3)}$$

The use of an IP address or portion thereof has several implications (e.g., an indication or geography), some of which are discussed in the following FIG. 6A.

Figure 6A:
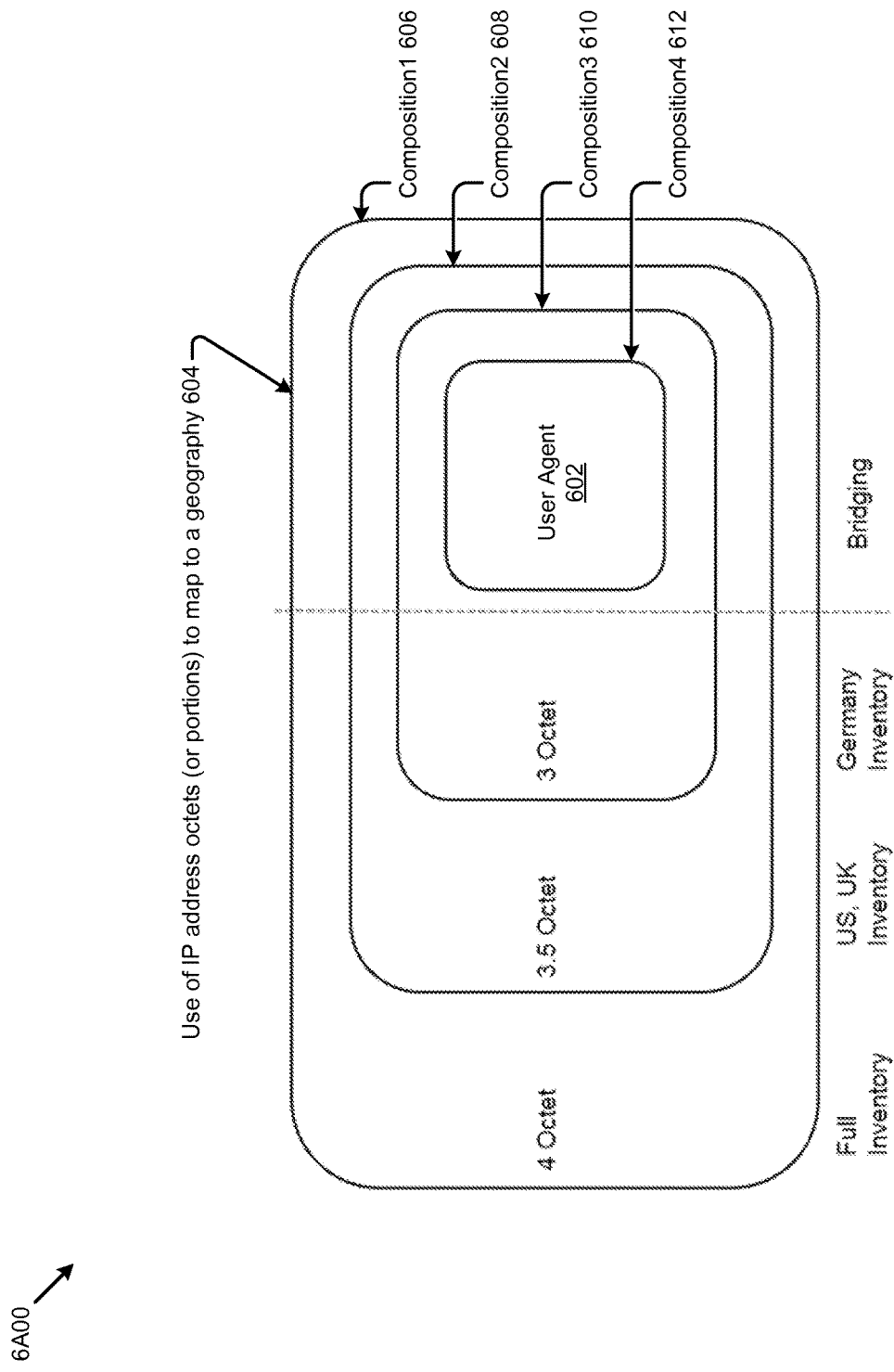
FIG. 6A is a bridging versus inventory chart as used in the generation of tunable progressive statistical user identification codes, according to some embodiments.

FIG. 6A is a bridging versus inventory chart 6A00 as used in the generation of tunable progressive statistical user identification codes. As an option, one or more instances of bridging versus inventory chart 6A00 or any aspect thereof may be implemented in the context of the architecture and functionality of the embodiments described herein. Also, the bridging versus inventory chart 6A00 or any aspect thereof may be implemented in any desired environment.

As shown in FIG. 6A, the bridging versus inventory chart shows several possible implementations of a bridging versus inventory metric. As shown, the bridging versus inventory chart 6A00 includes implementations of three variants of EQ. 3:

$$Word_{3Octet} = \{User\ Agent, 3\ octets\ of\ IP\ address\} \quad \text{(Eq. 4)}$$

$$Word_{3.5Octet} = \{User\ Agent, 3.5\ octets\ of\ IP\ address\} \quad \text{(Eq. 5)}$$

$$Word_{4Octet} = \{User\ Agent, 4\ octets\ of\ IP\ address\} \quad \text{(Eq. 6)}$$

The implementation of EQ. 4, EQ. 5, and EQ. 6 produce several compositions of the Word, namely composition1 606, composition2 608, and composition3 610. Additionally, and as shown, composition4 612 is formed from just the user agent information. Construction and uses of these compositions can be based on a geography 604 and/or characteristics of user devices (e.g., user characteristics of user agent 602). Characteristics and any respective values can be based on the user device (e.g., which device and which OS, etc.), and/or the user agent (e.g., which browser or browser version, or application, or app is in use, etc.), and/or any use model (e.g., what time periods the device is detected to be in use, etc.) and/or any characteristic that can be detected based on user interaction with the device. Further examples are given in the following FIG. 6B.

Figure 6B:
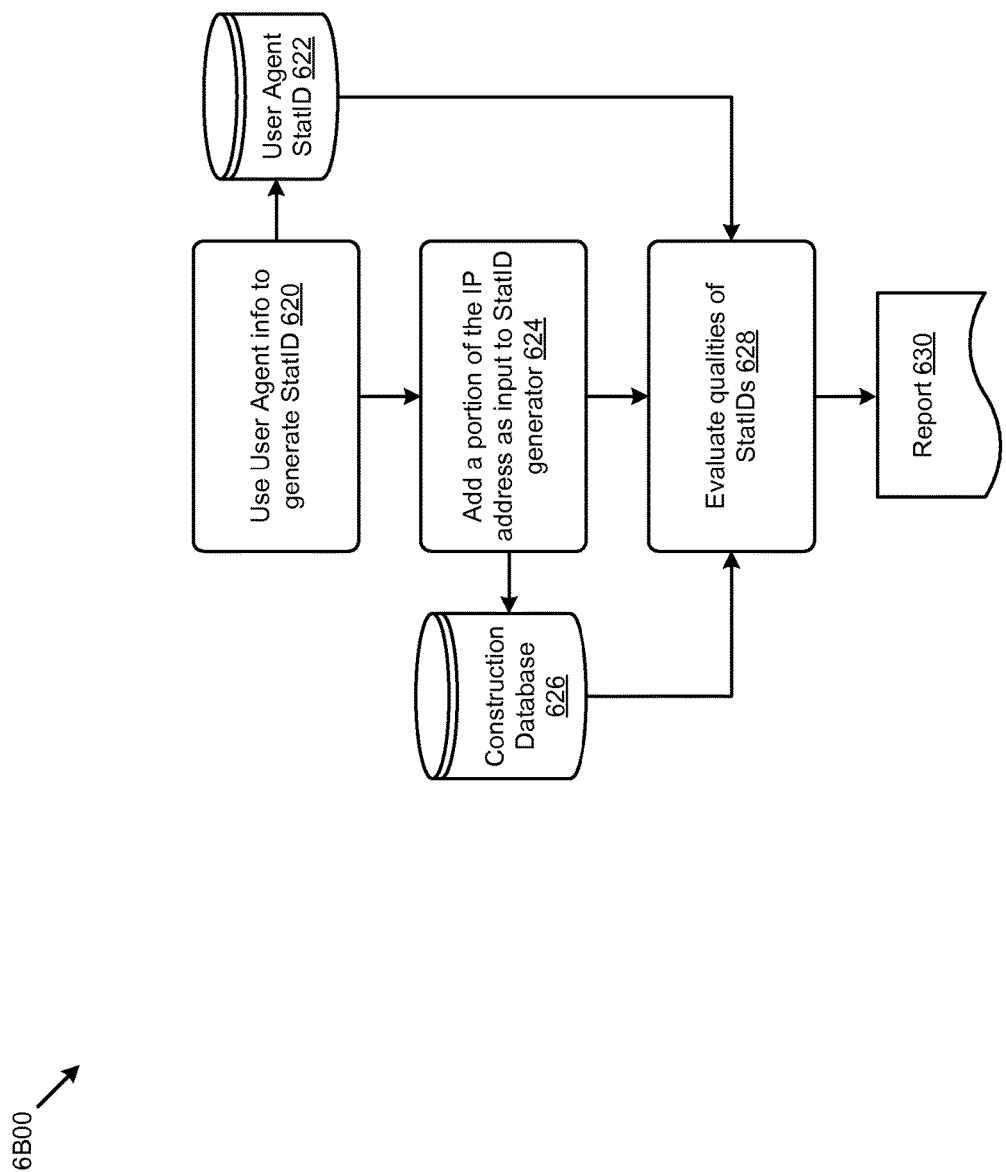
FIG. 6B depicts a flow chart as used for evaluating metrics in a system for generating tunable progressive statistical user identification codes, according to some embodiments.

FIG. 6B depicts a flow chart 6B00 as used for evaluating metrics in a system for generating tunable progressive statistical user identification codes. As an option, one or more instances of flow chart 6B00 or any aspect thereof may be implemented in the context of the architecture and functionality of the embodiments described herein. Also, the flow chart 6B00 or any aspect thereof may be implemented in any desired environment.

As shown in FIG. 6B, the flow chart comprises several processes. The flow commences by using user agent information to generate a StatID (see process 620). The generated StatIDs are stored in a user agent StatID database 622. Next, one or more of the aforementioned constructions can be formed by adding a portion of the IP address as input to a statistical ID generator (see process 624). The constructions are stored in a database of StatIDs with IP addresses (see construction database 626). Next, as shown, a process serves to evaluate qualities of the composed StatIDs (see process 628), and the qualities are organized into a report (see operation 630). Strictly as one example, the model performance breakdown chart of FIG. 6C gives one form of such a report.

FIG. 6C depicts a model performance breakdown chart 6C00 as used for evaluating metrics in a system for generating tunable progressive statistical user identification codes. As an option, one or more instances of model performance breakdown chart 6C00 or any aspect thereof may be implemented in the context of the architecture and functionality of the embodiments described herein. Also, the model performance breakdown chart 6C00 or any aspect thereof may be implemented in any desired environment.

FIG. 6C, depicts a model performance breakdown chart comprising a series of performance metrics pertaining to a mapping function to generate StatIDs. A column "Nx" refers to a calibrated number of known unique profiles (e.g., known unique users 660), and a column "Ny" gives the number of generated StatIDs 662 for the shown breakdown. Model performance can be measured as pertains to the qualities of a mapping function. Statistical metrics can be calculated over a particular mapping function. For example, statistical metrics can be used to estimate the extent of users distinguished based on a given set of characteristics. When there is a database of known users that are known to be associated with a particular characteristic or set of characteristics is available, then a particular mapping function can be generated (e.g., based on some portion of the same set of characteristics) so as to model or estimate correspondence to matching users (e.g., inventory) in the database. In some embodiments, a particular mapping function is used to determine a set of users that are distinguished based on a set of characteristics. The determined set of users can be measured to determine coverage over a population of IDs for which a similar or identical set of characteristics is known. When a high degree of coverage of the known population is measured, then it can be statistically predicted (e.g., within a confidence interval) how much coverage could be expected given a larger population.

The techniques to determine coverage of a population (e.g., inventory of users) can be used to determine a correlation to input signals (e.g., input signals from the aforementioned signal logs). For example, when a mapping function based on a set of input signals is deemed to provide a statistically measurable degree of coverage over a known population of IDs, then it follows that the same input signals used in the mapping function would be present (e.g., at least to the extent of a calculable confidence interval) in a larger population of generated IDs, such as would be generated over time from operation of user devices.

The aforementioned known population can be used to evaluate various qualities of a mapping function. Two of such qualities, namely fragmentation and collision, are depicted in FIG. 6C. In particular, columns "F" and "C" and "avgF" and "avgC" provide measures for the quality of the generated StatIDs (e.g., see fragmentation quality 664 and collision/compression quality 666). Any one or more quantities, including any one or more of the shown performance metrics can be normalized (e.g., to a value between 0 and 1) and/or any combination of two or more of the shown performance metrics can be normalized.

The normalized performance metrics can be used in implementing model tuning techniques, some of which are shown and described in the following figures.

Figure 7A:
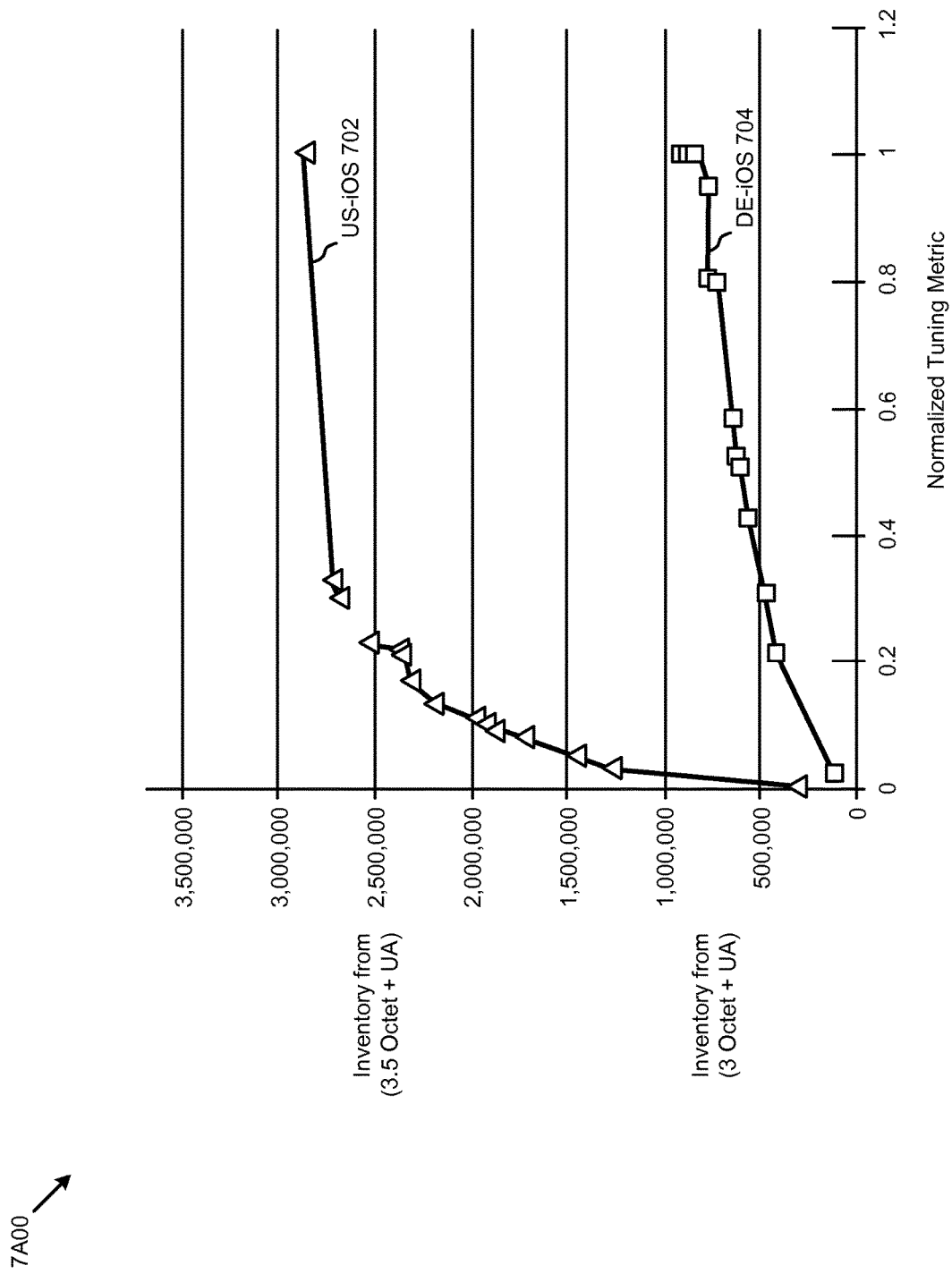
FIG. 7A is a model tuning breakdown chart as used for evaluating metrics in a system for generating tunable progressive statistical user identification codes, according to some embodiments.

FIG. 7A is a model tuning breakdown chart 7A00 as used for evaluating metrics in a system for generating tunable progressive statistical user identification codes. As an option, one or more instances of model tuning breakdown chart 7A00 or any aspect thereof may be implemented in the context of the architecture and functionality of the embodiments described herein. Also, the model tuning breakdown chart 7A00 or any aspect thereof may be implemented in any desired environment.

As shown in FIG. 7A, the model tuning breakdown chart compares the rise in inventory as a normalized tuning parameter is increased. As shown, there is a point of diminishing returns, beyond which point inventory coverage increases very slowly (see trend 702 and trend 704).

The origin (0,0) of this model tuning breakdown chart corresponds to the case where all sets of browser signals or user agent (UA) signals map through a statistical ID mapping function to the same statistical ID; there is no fragmentation. As features are added to the mapping function inputs (e.g., iPhone=TRUE), then the generated statistical ID takes on a greater range of possible values, which can be used to discriminate between one user profile and another user profile. Adding additional features would continuously produce more statistical IDs, however there is a reachable limit where adding more input to the mapping function would produce more statistical ID values even though the additional statistical IDs do not map to any additional profiles. For example, adding the characteristic "Born after 1800=TRUE" would not map to any additional profiles since all profiles would already carry this value. As shown in trend 702 and trend 704 there is a point in the trend where an incremental rise in inventory is smaller than a corresponding incremental increase in the tuning parameter. In many cases, that point can be selected as a desired level of fragmentation (e.g., a point of diminishing returns). In other cases, a still higher (or lower) degree of fragmentation is selected, so as to meet a given inventory requirement or constraint. Selecting a higher degree of fragmentation often means accepting the risk that two different statistical IDs actually represent the same person. Selecting a higher degree of bridging often means accepting the risk that one particular statistical IDs actually represents multiple different persons. Points of diminishing returns are shown and discussed as pertaining to FIG. 7B.

Figure 7B:
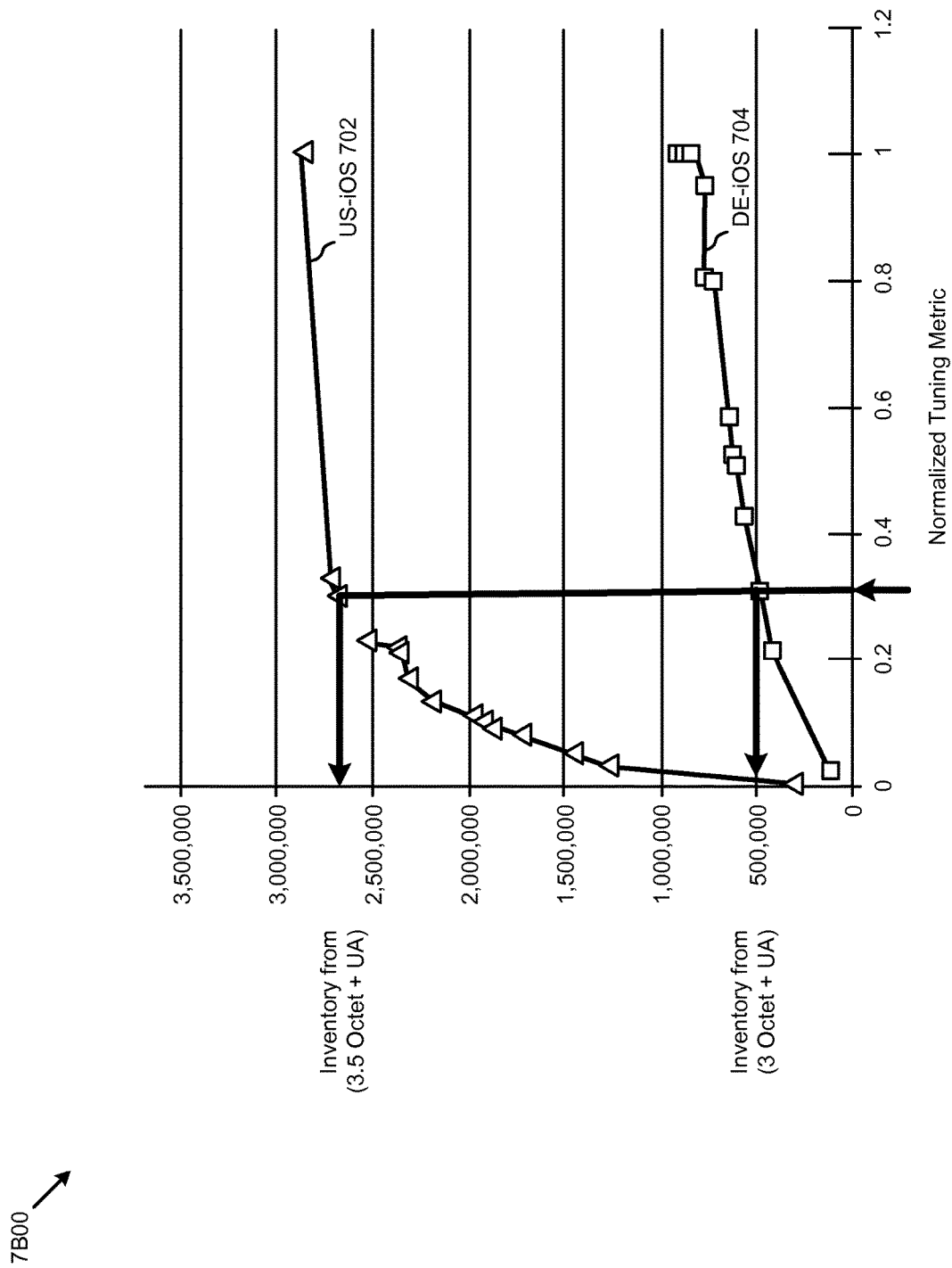
FIG. 7B depicts an inventory chart as used for evaluating metrics in a system for generating tunable progressive statistical user identification codes, according to some embodiments.

FIG. 7B depicts an inventory chart 7B00 as used for evaluating metrics in a system for generating tunable progressive statistical user identification codes. As an option, one or more instances of bridging versus inventory chart 7B00 or any aspect thereof may be implemented in the context of the architecture and functionality of the embodiments described herein. Also, the bridging versus inventory chart 7B00 or any aspect thereof may be implemented in any desired environment.

As shown in FIG. 7B, the inventory chart annotates a point of diminishing returns. Inventory quantities can be measured and any one or more of various methods can be used to determine a point of diminishing returns (e.g., a lower point of inflection, a higher point of inflection). An inventory and quantities thereto can be based on any characteristics or measures of the features, and/or combination of features and portions of the IP address. An inventory based on geography (e.g., USA or Germany) and a mobile device operating system type (e.g., Android, iOS) is given in the following FIG. 7C.

In some cases a statistical ID mapping function is tuned based one or more parameters that are endemic to a particular geography or commercial marketplace. Such a case is shown in the example of FIG. 7A, which is further annotated in FIG. 7B to show inventory in a "Germany" marketplace as compared with a "US" marketplace. A lower point of inflection might be determined for one given marketplace and a higher point of inflection might be determined for another given marketplace. A marketplace can be further divided into sub-markets that correspond to user agent features. Strictly as one example, FIG. 7C depicts the case where a selected agent feature can include a device type or device platform (e.g., iOS platforms versus Android platforms).

Some embodiments calculate collision statistics fragmentation statistics, and inventory statistics contemporaneously, so as to form a tuned mapping function. Collision statistics, fragmentation statistics, inventory levels, confidence interval statistics, and other quantities can be calculated using a known ID database 158. In some situations, collision statistics are dominant (e.g., so as to avoid an overly inclusive set of signals), and in other situations fragmentation statistics are dominant (e.g., so as to avoid generating multiple IDs for the same user). In still other situations, inventory levels are dominant. For example, after generation of a candidate mapping function, the candidate mapping function can be used to generate identification codes (e.g., StatIDs) based on signals present in a database of known IDs, and then comparing the set of generated identification codes to ID entries in a set of known IDs to determine projected inventory quantities or ratios. The projected inventory quantities are based at least in part on a number of known IDs that are mapped to by the candidate mapping function. If the candidate mapping function maps to, for example, 70% of the users in a sample set (e.g., database of known IDs), then it can be predicted (e.g., within a calculable confidence interval) that the same candidate mapping function would map to, for example, 70% of the new users (e.g., users without IDs in a sample set. The accuracy (e.g., confidence interval) of the prediction can be calculated—the larger the sample set, the more accurate the prediction will be.

The signals used to form a candidate mapping function can be selected with respect to a particular sample set. For example, a signal involving a portion of an IP address that is tied to a particular geographic location (e.g., Germany) can be considered, and the sample set might be selected to include only users that identify as "German", or "in Germany". Many or fewer such signals can be selected (e.g., based on a device type, or based on an operating system, etc.). Many variations are possible, some of which variations are shown and discussed as pertaining to FIG. 7C.

Figure 7C:
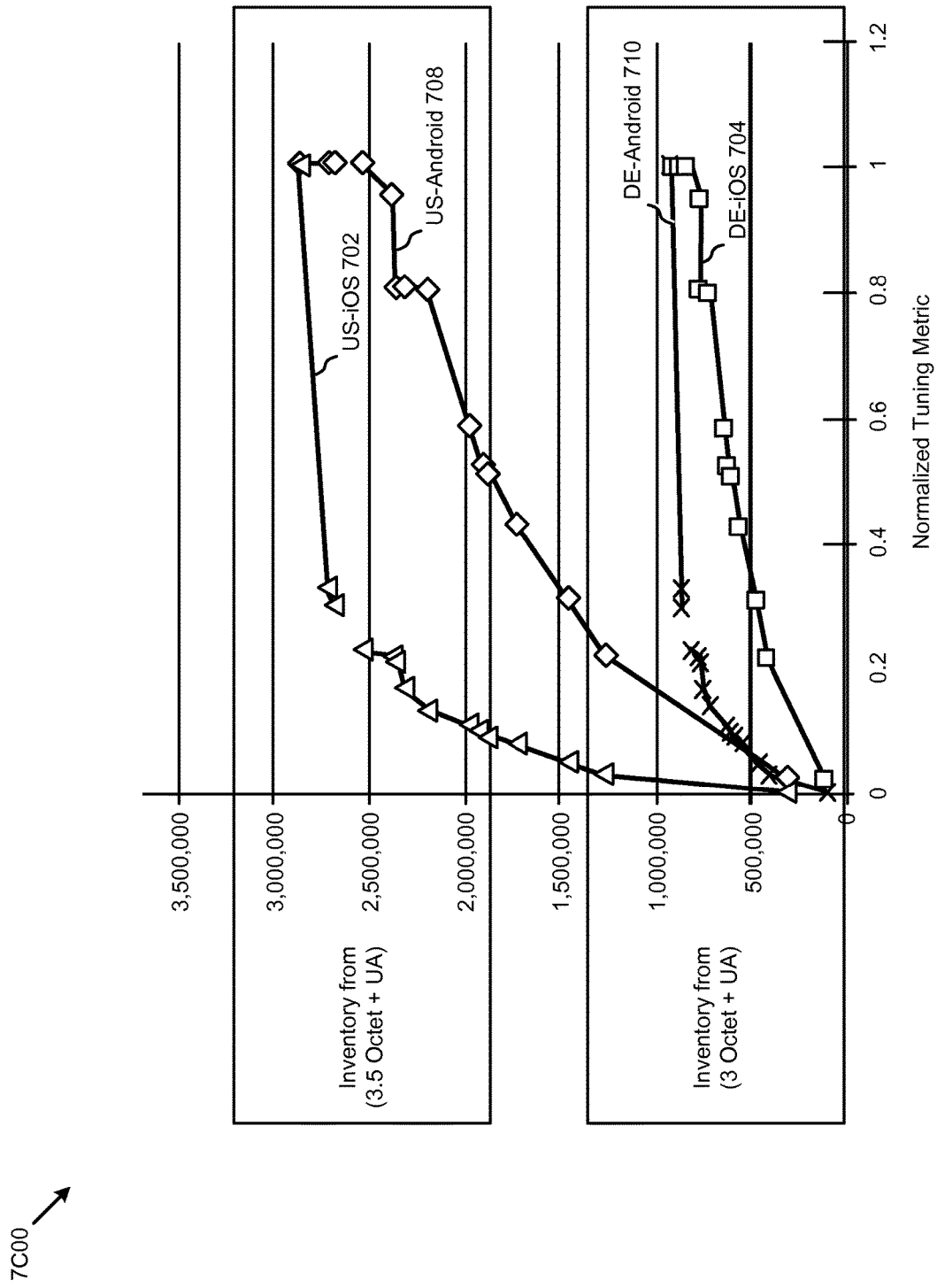
FIG. 7C depicts an inventory chart over selected devices as used for evaluating metrics in a system for generating tunable progressive statistical user identification codes, according to some embodiments.

FIG. 7C depicts an inventory chart over selected devices 7C00 as used for evaluating metrics in a system for generating tunable progressive statistical user identification codes. As an option, one or more instances of fragmentation versus inventory chart over selected devices 7C00 or any aspect thereof may be implemented in the context of the architecture and functionality of the embodiments described herein. Also, the fragmentation versus inventory chart over selected devices 7C00 or any aspect thereof may be implemented in any desired environment.

As shown in FIG. 7C, the inventory chart over selected device platforms comprises a comparison of inventory with respect to fragmentation based on device operating system. The depiction of FIG. 7C is purely exemplary, and myriad other possibilities exist and can be configured (e.g., via a query made to a database engine). In addition to the aforementioned inventories and trends (e.g., trend 702 and trend 704), inventory curves are shown for US-based Android devices (e.g., see trend 708) and Germany-based Android devices (e.g., see trend 710).

Inventory curves and trends (and any points of diminishing returns) can be presented in chart form such as given in FIG. 7C. Such curves can be calculated and shown for any feature or geography or any combination of features and/or geographies.

FIG. 8A depicts a feature mapping matrix 8A00 having an offending feature as used in the generation of tunable progressive statistical user identification codes. As an option, one or more instances of feature mapping matrix 8A00 or any aspect thereof may be implemented in the context of the architecture and functionality of the embodiments described herein. Also, the feature mapping matrix 8A00 or any aspect thereof may be used for device tuning, and/or may be implemented in any desired environment.

As shown in FIG. 8A, the example feature mapping matrix 806 comprises StatIDs S1 through S4, each of which are mapped to a device characteristic. In this example, device characteristics pertaining the iOS map 803 are "Mozilla", "iPhone", and "iOS". The device characteristics pertaining to the Android map 805 are "Android", "Linux", and "Mobile".

By observation, and as shown, the "Mobile" mapping of StatID S3 contains an offending feature. The offending feature causes undesirable effects. The depiction of FIG. 8A illustrates fragmentation for two devices: Device 1 (S1, S2), and Device 2 (S3, S4). The features "Linux" and "Mobile" causes the SID fragmentation of Device 1 and "Mobile" causes fragmentation on Device 2. The feature "Mobile" causes two devices to fragment and feature "Linux" causes only one device to fragment.

Figure 8B:
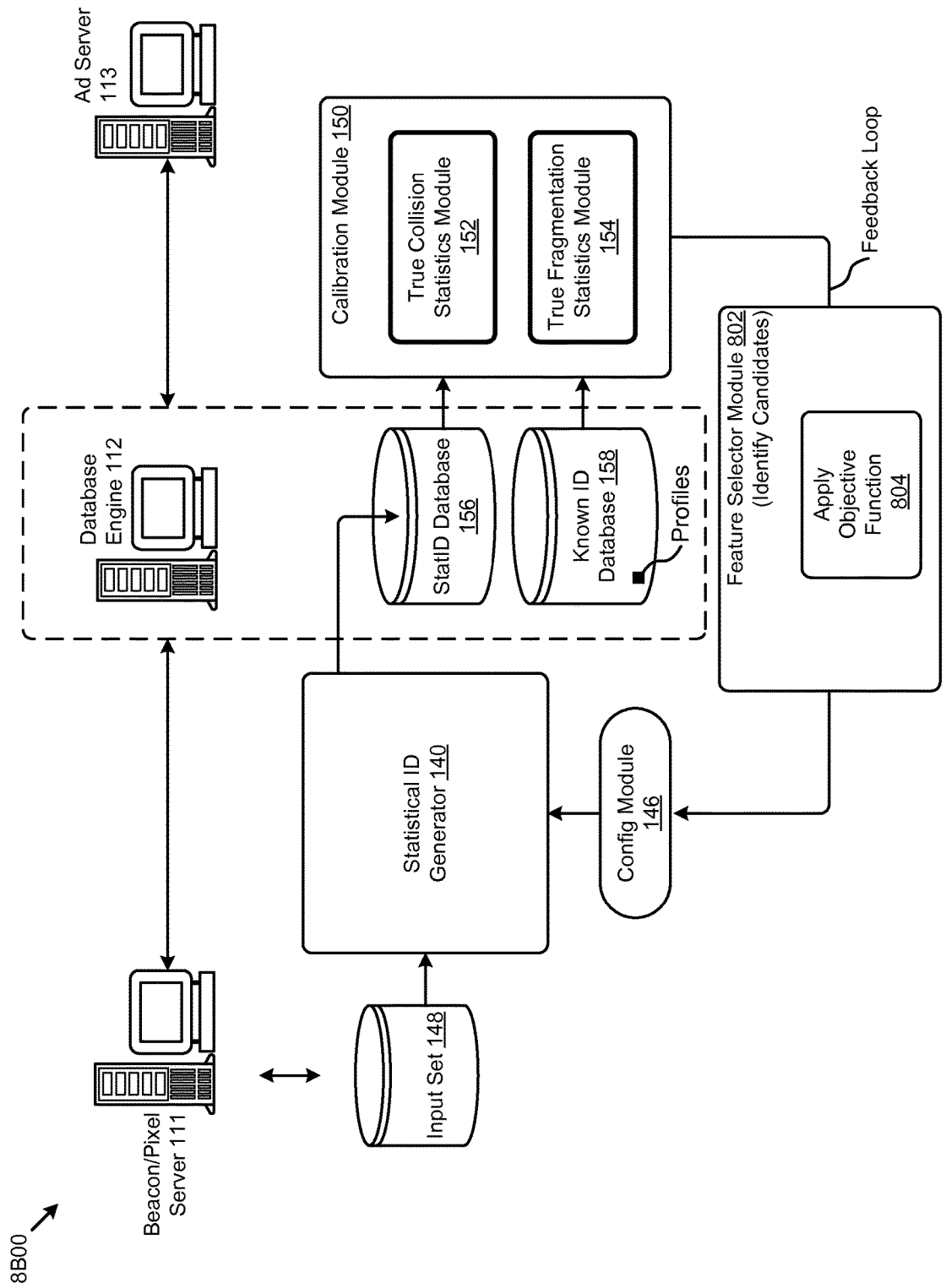
FIG. 8B depicts a flow chart having a feature selection feedback loop having an offending feature as used in the generation of tunable progressive statistical user identification codes, according to some embodiments.

FIG. 8B depicts a flow chart having a feature selection feedback loop 8B00 having an offending feature as used in the generation of tunable progressive statistical user identification codes. As an option, one or more instances of flow chart having a feature selection feedback loop 8B00 or any aspect thereof may be implemented in the context of the architecture and functionality of the embodiments described herein. Also, the flow chart having a feature selection feedback loop 8B00 or any aspect thereof may be implemented in any desired environment.

As shown in FIG. 8B, the flow chart having a feature selection feedback loop comprises a feature selector module to identify candidate features (see module 802), and a module to apply an objective function to the selection of candidate features (see operation 804). The application of an objective function can involve a large number of combinations of features.

Progressive Statistical IDs

FIG. 9A is a chart 9A00 depicting a declining value of the utility of a feature through the progression of time. Certain features may have high utility at the time they first appear, but may decline in value or utility over time. Strictly as one example, the iOS version (e.g., iOS version 5.3) might have had high utility to discriminate between different users. However, as time progresses, additional iOS versions are released (e.g., "IOSv6", "IOSv7", "IOSv8", etc.), and the older versions fade into disuse. Over a certain passage of time, few users use "IOS version 5.3" so it is not useful in any mapping function, and can be dropped (see operation 958 of FIG. 9D). The aforementioned iOS version is merely one illustrative example. Many features that were at one moment in time useful in the context of a mapping function to produce a StatID mapping function might become less useful or obsolete as time passes.

Many of the StatID mapping functions heretofore discussed are optimized for features, signals and user observations assessed at a particular point in time. Yet, over the passage of time, the quality of the Stat ID model tends to decline as new features emerge, and as popular devices and/or their operating systems, and/or app usage patterns change, and as user behavior changes. Strictly as examples, the introduction of new phones, operating systems, apps and browser versions can introduce new features and/or signals and/or any formatting of keywords into user agent strings. Such new features and/or signals and/or any formatting of keywords would not have been supported in earlier mapping functions. Such new features and/or signals and/or keywords can affect the measurements and/or calibration of a mapping function. Strictly as an example, certain operating systems may be observed to have an initially-high adoption rates (e.g., at the moment when a previous mapping function was calibrated), but later, that same operating system might be observed have a much lower adoption rate. In a contrary example, newly-introduced mobile devices can have low adoption upon initial introduction, and then later, exhibit a higher adoption rate. Such changes in the frequency of observations of features and/or user behavior may introduce unwanted levels of fragmentation or unwanted levels of collisions. Some optimizations can be approached by considering a combination of factors in an optimization function that accounts for a total number of duplicates as well as an overall coverage of the second set. Some optimizations can be approached by defining an optimization function that considers one or more factors that are inversely correlated with the overall coverage (e.g., for a certain range of totals). Some optimization functions solve for a maximization (or minimization) of one variable subject to one or more constraints of other variables.

One way to manage such a changing landscape of features is to recalibrate a new mapping function periodically to form a progression of mapping functions, so as to optimize the selected feature set to account for more recently-observed signals. Such recalibration serves to maintain high performance with respect to accuracy, fragmentation, collisions, and any other quality metrics. A progression, specifically as first-to-last sequence is depicted in FIG. 9B.

Figure 9B:
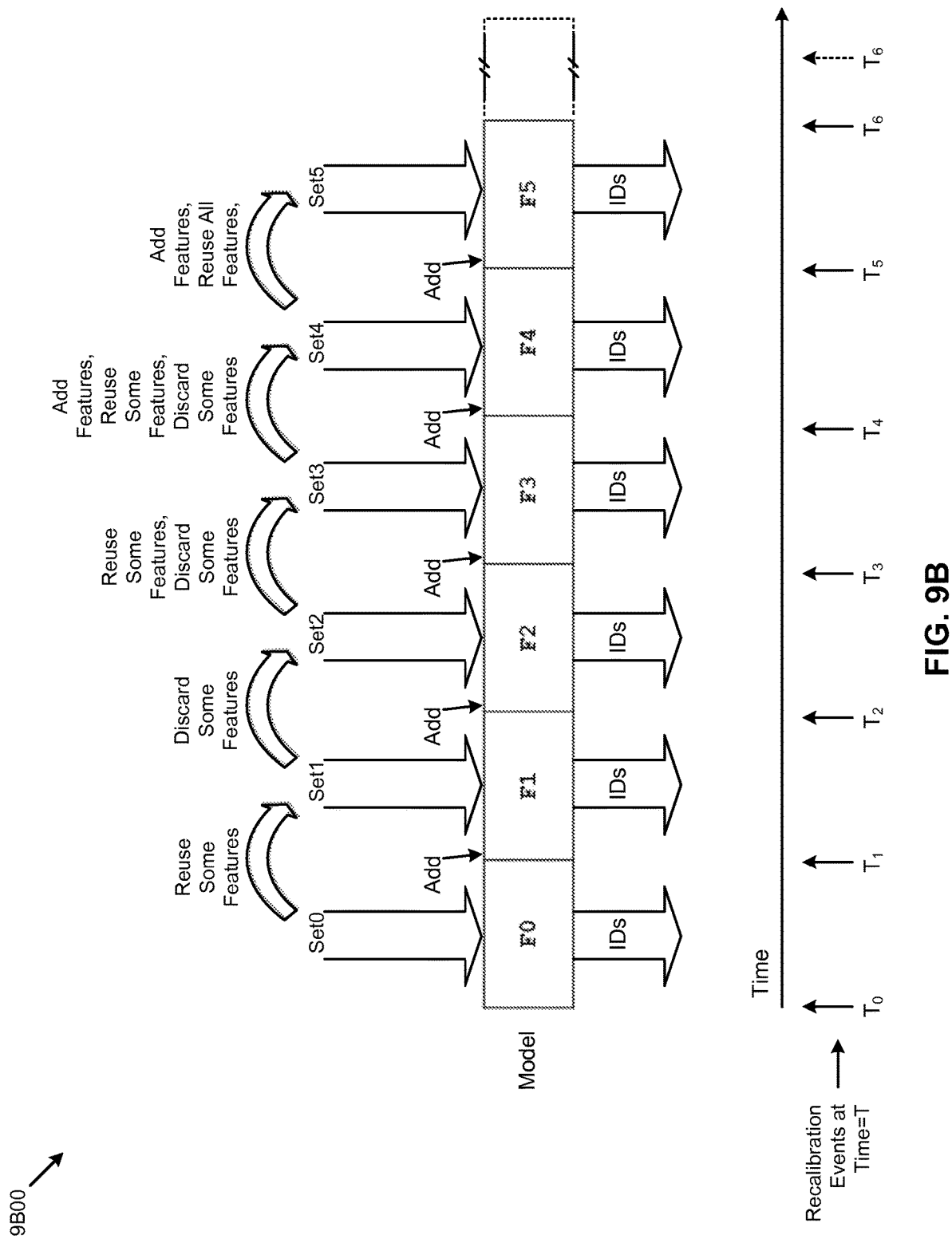
FIG. 9B shows a first-to-last sequence of mapping functions as used in the generation of tunable progressive statistical user identification codes, according to some embodiments.

FIG. 9B shows a first-to-last sequence 9B00 of mapping functions as used in the generation of tunable progressive statistical user identification codes. As an option, one or more instances of first-to-last sequence 9B00 or any aspect thereof may be implemented in the context of the architecture and functionality of the embodiments described herein. Also, the first-to-last sequence 9B00 or any aspect thereof may be implemented in any desired environment.

Adding New Features to a Progression of Statistical ID Mapping Functions

As shown in FIG. 9B, the first-to-last sequence comprises a progression from mapping function F0 (e.g., using one set of features) through to mapping function F5 (e.g., using a different set of features). Each step in the progression corresponds to one or more new features being brought into a corresponding mapping function. For example, a new version of iOS may come to market, and can be used in the calculation of a StatID for a user. It is possible to progressively provide new mapping functions as new features become available. The first-to-last sequence 9B00 is formed by progressively adding a mapping function to the regime. As depicted, the model initially comprises only mapping function F0 that becomes activated at time=$T_0$. At time $T_1$, mapping function F1 becomes activated, and mapping function F0 remains activated. At time $T_2$, mapping function F2 becomes activated, and mapping functions F0 and F1 remain activated, and so on.

Eliminating Features from a Progression of Statistical ID Mapping Functions

Similarly, some features fade into disuse and are not prevalent enough to influence quality metrics. Deprecated features should be progressively eliminated, while bringing in new features that are emerging and/or becoming prevalent. To do so, a series of hashing functions can be formed into a progression sequence (e.g., oldest to newest) and as new features are included in a StatID generation process, old features are deprecated and eventually eliminated.

Figure 9C:
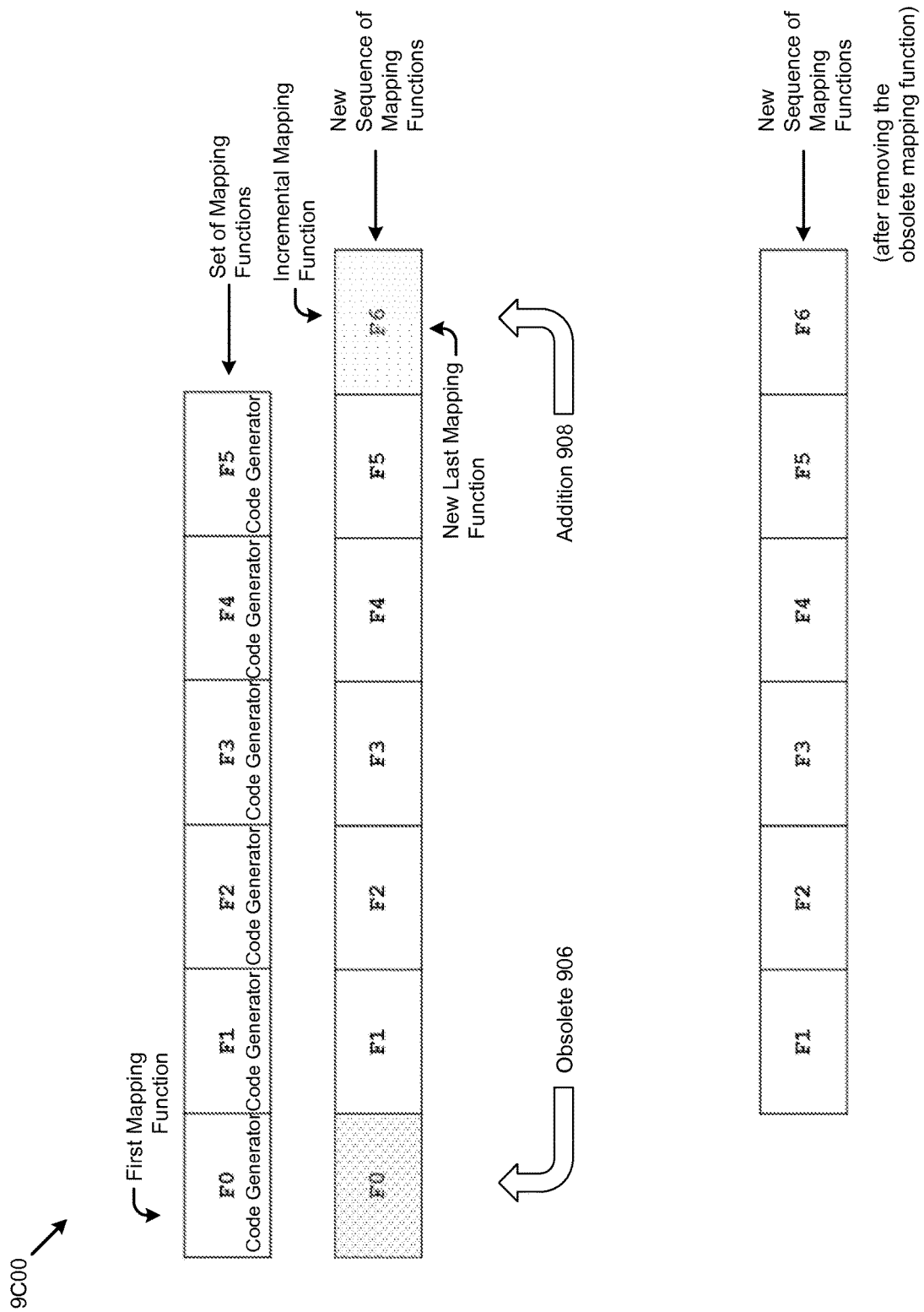
FIG. 9C depicts an updated first-to-last sequence of mapping functions as used in the generation of tunable progressive statistical user identification codes, according to some embodiments.

Such a regime for adding a newly-generated hashing function to a sequence and obsoleting the oldest hashing function is shown and described as pertaining to FIG. 9C.

FIG. 9C depicts an updated first-to-last sequence 9C00 of mapping functions as used in the generation of tunable progressive statistical user identification codes. As an option, one or more instances of updated first-to-last sequence 9C00 or any aspect thereof may be implemented in the context of the architecture and functionality of the embodiments described herein. Also, the updated first-to-last sequence 9C00 or any aspect thereof may be implemented in any desired environment.

As shown in FIG. 9C, a rotation is shown by juxtaposing an older model progression next to a newer model progression. The new model progression adds the new hashing function F6 (see addition 908) and renders obsolete the oldest hashing function F0 (see obsolete 906). This is merely one example, and longer (or shorter) sequences are possible. As is further discussed below, a model progression can be changed very frequently. A new mapping function in a model progression sequence can be added asynchronously with the deprecation of a mapping function in the same model progression sequence.

A new mapping function can add features that will aid in differentiating users based on recent activity. At the same time, users or profiles that do not possess the new feature need not change their respective StatIDs. Avoiding changing the mapping function(s) that map to profiles that do not possess the new feature serves to maintain continuity for data providers that have stored data against these IDs. It also serves the needs of data buyers that have purchased data against these IDs. This situation presents two apparently-conflicting objectives. That is, a new mapping function using new features should be added as frequently as the utility of new features are discovered. However, adding a new mapping function should not cause churn or otherwise negatively impact continuity for data providers that have stored data against these IDs and/or for data buyers that have purchased data.

One possibility for managing the aforementioned apparently-conflicting objectives is to add features aggressively to add a new mapping function to a progression. This has the advantage of reducing collisions, however it also means that the results of the new mapping function need to be stored—consuming storage space. Another possibility for managing the aforementioned apparently-conflicting objectives is to aggressively remove or render obsolete mapping functions from a progression—releasing storage space. Each of these options have additional desirable and undesirable effects as is depicted in the following table.

TABLE 1

Desirable and Undesirable Effects

| | Aggressively Add Mapping Functions | Aggressively Eliminate Mapping Functions |
|---|---|---|
| Pro/Desirable | Better user profile discrimination when using the new mapping functions | Releases storage space |
| Con/Undesirable | Consumes storage space | Data purchasers cannot retrieve profiles using older mapping functions |

One way to optimize for adding new features and maintaining stable ID access is to keep all features from the previous model and add any new features identified by a recalibration process into a new mapping function. For example, features "Mozilla", "Safari", and "10_9_3" have existed as part of an older model (e.g., "model v1"). A recalibration process determines features of a newer model (e.g., "model v2") to use features "Safari" and "10_9_4". The "model v2" would include the following features "Mozilla", "Safari", "10_9_3" and "10_9_4".

Another way to optimize for adding new features and maintaining stable ID access is to evaluate the features in previous model that are not part of the current model and remove the features as possible that result in a retrieval impact that is less than a threshold number or percentage of users. The threshold number or percentage of users can be based on an acceptable level of lost or churned IDs. Following the foregoing example, the two features in "model v2" that are not in "model v1" are "Mozilla", and "10_9_3". If "Mozilla" continues to be present in (for example) 7% of user agent strings, but "10_9_3" is present in only 0.01% of user agent strings. In such a case a threshold percentage value of 5% would exclude "10_9_3" while keeping "Mozilla". The times at which to invoke a recalibration process can follow a particular periodicity, or, a time at which to invoke a recalibration process can be triggered whenever collision statistics and/or fragmentation statistics are calculated.

Figure 9D:
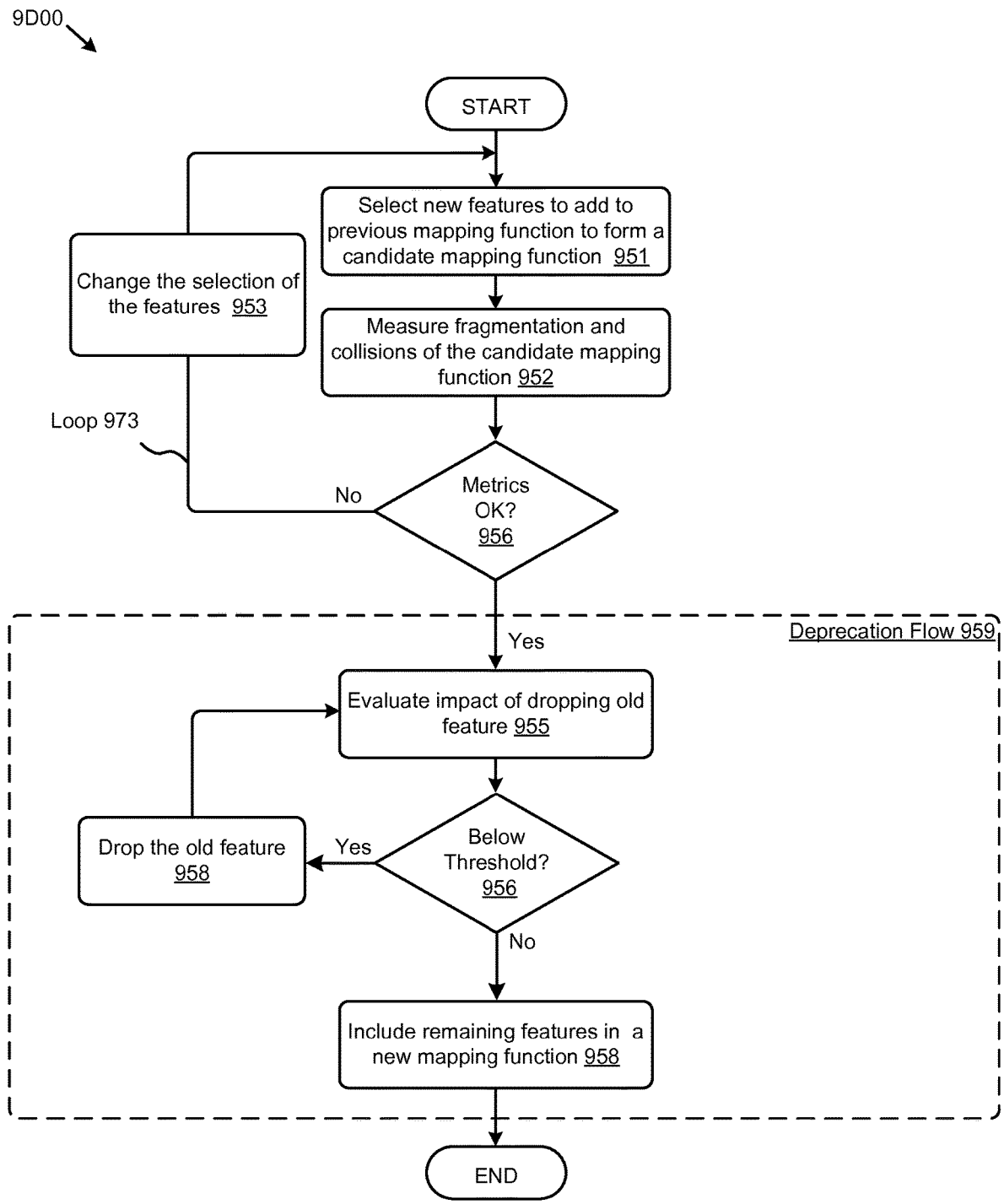
FIG. 9D is a flow chart showing operations and decision as used in the generation of tunable progressive statistical user identification codes, according to some embodiments.

FIG. 9D is a flow chart 9D00 showing operations and decision as used in the generation of tunable progressive statistical user identification codes. The shown flow commences at START and selects a set of new features and adds them to a previous mapping function to form a candidate mapping function (see operation 951). The metrics for the mapping function based on the selected features are quantified, (see operation 952) and if the metric are OK (e.g., acceptable levels of fragmentation, acceptable levels of collisions) then the flow proceeds to evaluate the impact of dropping old features (see operation 955). If the metrics are not OK (see decision 956) then loop 973 is taken and a different selection of the features is considered (see operation 953).

When the different selection of features is considered (see operation 953) the impact of a particular feature is compared against a threshold amount. If the impact of dropping that particular feature is below a threshold, then the particular feature can be dropped. After such consideration (e.g., over the entire set of old features) then the flow will assign a new mapping function, and will use the remaining features in the new mapping function (see operation 958).

The flow can be performed at any moment in time, and the flow might result in a decision to add a new mapping function (see decision 984). It is also possible to execute the flow, or a portion of the flow (e.g., deprecation flow 959) so as to make a decision to deprecate an older mapping function (see decision 980). Decisions to add a new mapping function and/or decisions to deprecate an older mapping function can be made independently. A first-to-last sequence can be increased in length by decision to add a new mapping function. Or, a first-to-last sequence can be decreased in length by decision to deprecate an older mapping function. Decisions that result in an increased length of a first-to-last sequence or decisions that results in a decreased length of first-to-last sequence can be taken independently. In some cases a decisions to add a new mapping function can be made contemporaneously with a decision to keep (e.g., not deprecate) an older mapping function (see decision 982) when forming a new first-to-last sequence.

Figure 9E:
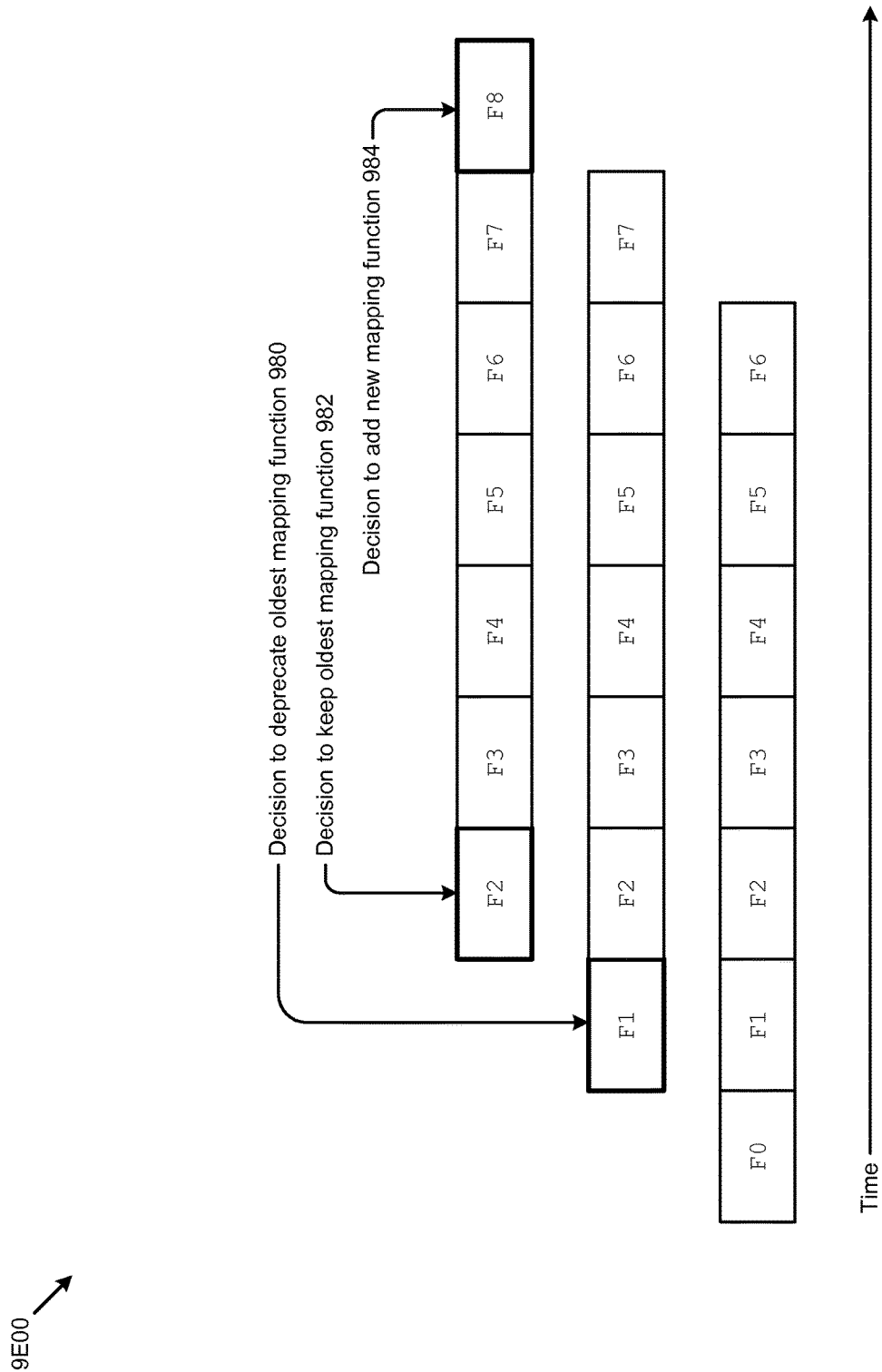
FIG. 9E depicts a progression of first-to-last sequences as used in the generation of tunable progressive statistical user identification codes, according to some embodiments.

FIG. 9E is a chart 9E00 depicting a progression of first-to-last sequences as used in the generation of tunable progressive statistical user identification codes, according to some embodiments.

Figure 9F:
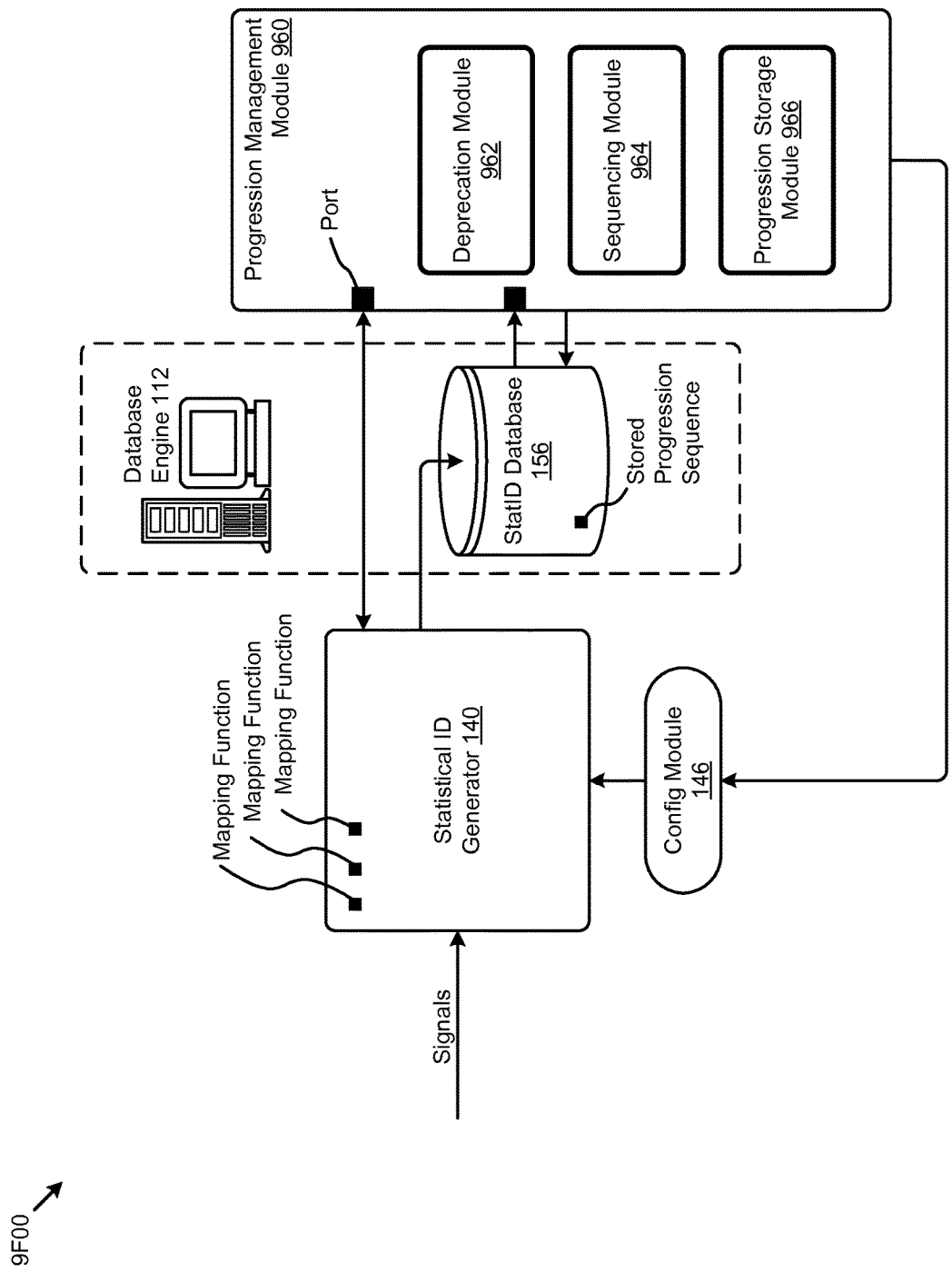
FIG. 9F depicts a system to manage a progression of first-to-last sequences as used in the generation of tunable progressive statistical user identification codes, according to some embodiments.

FIG. 9F is a chart 9F00 depicting a system to manage a progression of first-to-last sequences as used in the generation of tunable progressive statistical user identification codes. The shown system comprises operational units for managing a progression of user identification code generators. As shown, the system includes a statistical ID generator 140 that serves to generate mapping functions from respective selections of signals. The mapping functions are stored in a StatID database 156. The StatID database can store a plurality of mapping functions as progression sequences, and such progression sequences can be accessed by a progression management module 960 (e.g., see the IO port). The plurality of mapping functions corresponds to a sequence of mapping functions. A sequence has a first mapping function and a last mapping function, and any instance of a mapping function from the sequence of mapping functions can generate user identification codes. The statistical ID generator further comprises logic for constructing an incremental mapping function, which incremental mapping function uses at least some inputs different from the other mapping functions of the progression sequence. A deprecation module 962 serves to mark one or more mapping function of the sequence of mapping functions as deprecated, and a sequencing module 964 serves to establish the incremental mapping function as a new mapping function within the sequence of mapping functions. A progression storage module 966 can store the progression into the StatID database. In some cases a configuration can be set to establish a new sequence of mapping functions to be used beginning at a particular moment in time.

Additional Embodiments of the Disclosure

Tunable Statistical ID

Figure 10:
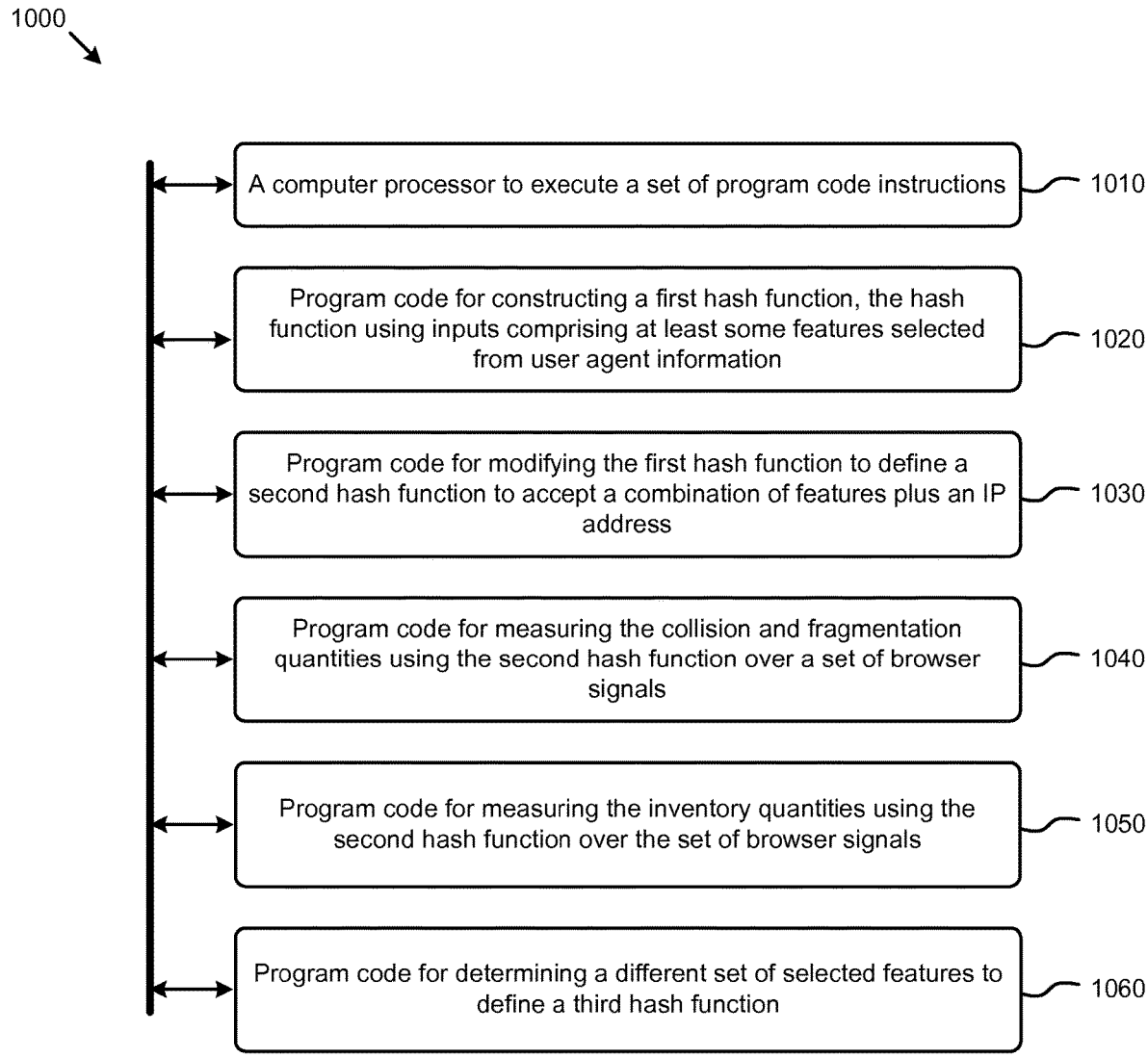
FIG. 10 is a block diagram of a system for tunable progressive statistical user identification codes, according to one embodiment.

FIG. 10 is a block diagram of a system for tunable progressive statistical user identification codes, according to some embodiments. The system includes a processor module 1010 and commences upon constructing a first hash function, the hash function using inputs comprising at least some features selected from user agent information (see module 1020), then modifying the first hash function to define a second hash function to accept a combination of features plus an IP address (see module 1030), measuring the collision and fragmentation quantities using the second hash function over a set of browser signals (see module 1040), measuring the inventory quantities using the second hash function over the set of browser signals (see module 1050); and determining a different set of selected features to define a third hash function (see module 1060).

Steps for generating user identification codes can have many commencement point and/or variations. In one embodiment, such steps commence upon receiving a first plurality of signals (e.g., generated from operation of user devices), where at least some of the first plurality of signals comprise characteristics of respective user devices. Such characteristics can derive from user interactions with respective user devices. A mapping function generator calculates the extent of collisions and fragmentation statistics when a generated mapping function is applied over a population of IDs (e.g., a test set) for which the characteristics are known. For example, collision statistics predict how many different users are assigned to the same identification codes. When the population of IDs is covered to a particular degree (e.g., collisions are sufficiently low) then the generated mapping function can be used to generate a plurality of identification codes that derive from new incoming signals (e.g., from the signal logs), and the coverage of the new, incoming population can be predicted—at least within a statistical confidence interval. More particularly, a mapping function and a first set of IDs (for which user correspondence is known) can be used to estimate the extent of coverage of an arbitrary or random second set of users that are distinguished based on the same characteristics. A coverage prediction value (and confidence interval) can be determined by comparing measured coverage of the first set (and the size of the first set) to determine how many IDs of the second set of IDs would be covered by identification codes generated from the first mapping function. When the prediction value (and confidence interval) for an arbitrary or random second set of users is deemed to be covered to a particular degree by using the generated mapping function, then the mapping function can be used to approximate IDs based on an arbitrary (e.g., future) set of incoming signals as would be generated over time from operation of the user devices.

In some cases, determining that the IDs of the second set are covered to a particular degree excludes duplicates, or permits coverage over duplicates only to a threshold amount of duplicates (e.g., so as to not introduce bias into the collision or fragmentation statistics). In some cases determining that the IDs of the second set are covered to a particular degree comprises reaching or surpassing a threshold amount, which threshold amount can be based on a curve such as an inventory curve. In some cases an optimization function can be defined that maximizes one factor or variable subject to one or more constraints of other factors or variables.

Progressive Statistical ID

Figure 11:
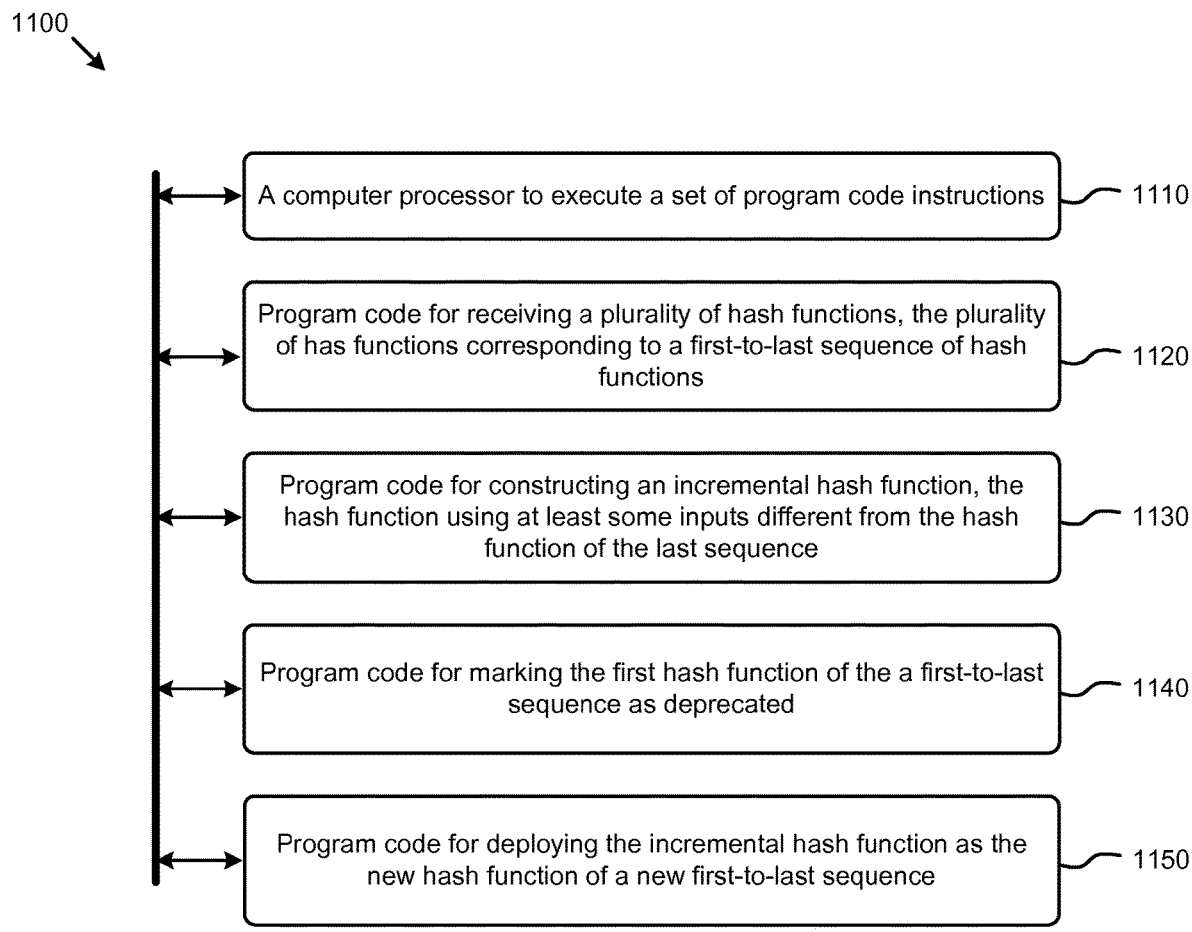
FIG. 11 is a block diagram of a system for tunable progressive statistical user identification codes, according to one embodiment.

FIG. 11 is a block diagram of a system for tunable progressive statistical user identification codes, according to some embodiments. The system includes a processor module 1110 and commences upon receiving a plurality of mapping functions, the plurality of hash functions corresponding to a first-to-last sequence of mapping functions (see module 1120), then constructing an incremental hash function, the hash function using at least some inputs (e.g., features) different from the inputs to the hash function of the last sequence (see module 1130), marking the first hash function of the a first-to-last sequence as deprecated (see module 1140); and deploying the incremental hash function as the new hash function of a new first-to-last sequence (see module 1150).

System Architecture Overview

Additional System Architecture Examples

Figure 12A:
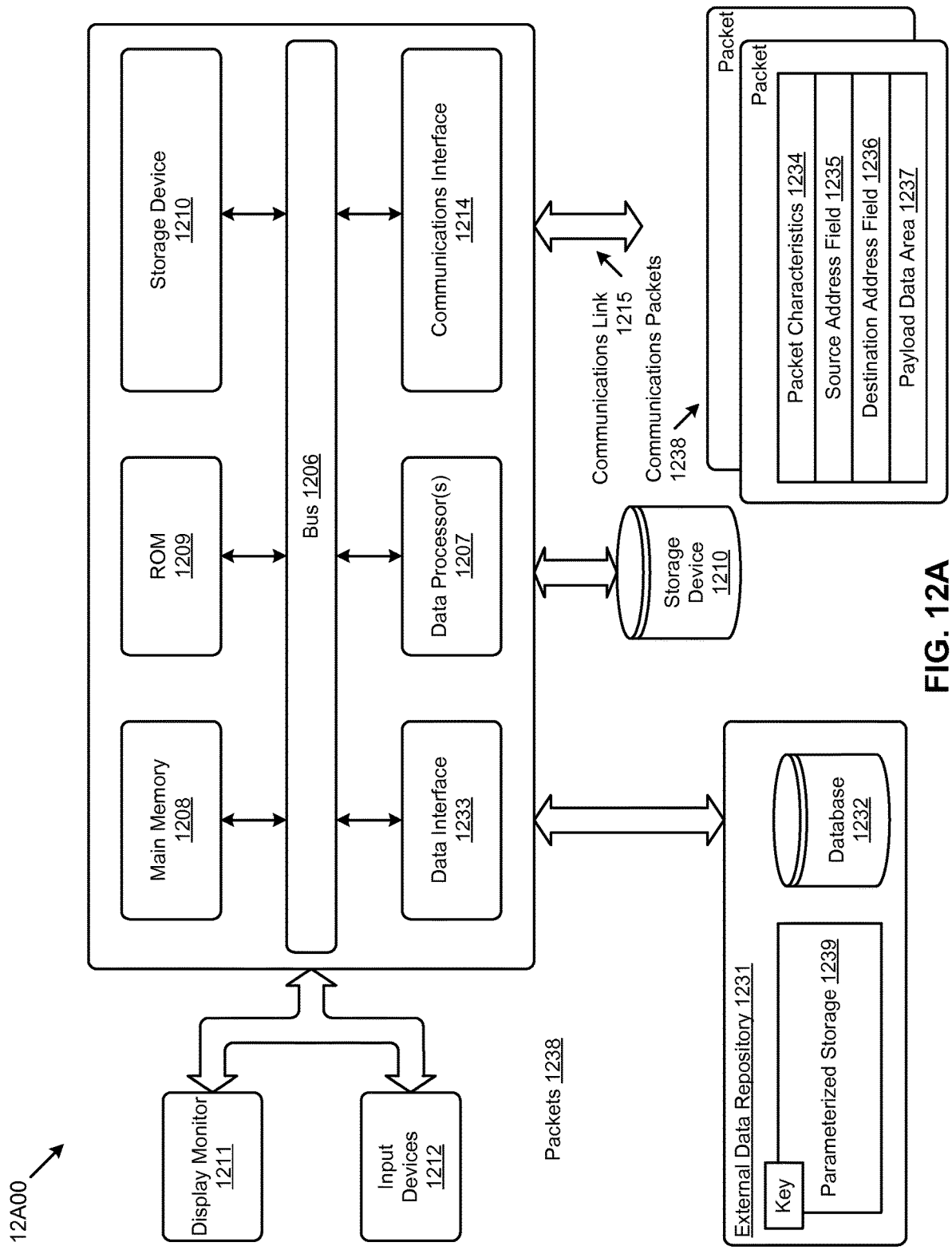
FIG. 12A, FIG. 12B, and FIG. 12C depict exemplary architectures of components suitable for implementing embodiments of the present disclosure, and/or for use in the herein-described environments.

FIG. 12A depicts a block diagram of an instance of a computer system 12A00 suitable for implementing embodiments of the present disclosure. Computer system 12A00 includes a bus 1206 or other communication mechanism for communicating information, which interconnects subsystems and devices such as a processor 1207, a system memory (e.g., main memory 1208, or an area of random access memory RAM), a static storage device (e.g., ROM 1209), an internal or external storage device 1210 (e.g., magnetic or optical), a data interface 1233, a communication interface 1214 (e.g., PHY, MAC, Ethernet interface, modem, etc.), a display 1211 (e.g., CRT or LCD), input devices 1212 (e.g., keyboard, cursor control), and an external data repository 1231.

According to an embodiment of the disclosure, computer system 12A00 performs specific operations by processor 1207 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic and/or can carry out computations and/or processing steps using one or more processes and/or one or more tasks and/or one or more threads or any combination therefrom.

According to an embodiment of the disclosure, computer system 12A00 performs specific networking operations using one or more instances of communication interface 1214. Instances of the communication interface 1214 may comprise one or more networking ports that are configurable (e.g., pertaining to speed, protocol, physical layer characteristics, media access characteristics, etc.) and any particular instance of the communication interface 1214 or port thereto can be configured differently from any other particular instance. Portions of a communication protocol can be carried out in whole or in part by any instance of the communication interface 1214, and data (e.g., packets, data structures, bit fields, etc.) can be positioned in storage locations within communication interface 1214, or within system memory, and such data can be accessed (e.g., using random access addressing, or using direct memory access (DMA), etc.) by devices such as processor 1207.

The communications link 1215 can be configured to transmit (e.g., send, receive, signal, etc.) communications packets 1238 comprising any organization of data items. The data items can comprise a payload data area 1237, a destination address 1236 (e.g., a destination IP address), a source address 1235 (e.g., a source IP address), and can include various encodings or formatting of bit fields to populate the shown packet characteristics 1234. In some cases the packet characteristics include a version identifier, a packet or payload length, a traffic class, a flow label, etc. In some cases the payload data area 1237 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1207 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 1231, which in turn can be formatted into any one or more storage areas and which can comprise parameterized storage 1239 accessible by a key (e.g., filename, table name, block address, offset address, etc.).

In an embodiment of the disclosure, execution of the sequences of instructions to practice the disclosure is performed by a single instance of the computer system 12A00. According to certain embodiments of the disclosure, two or more instances of computer system 12A00 coupled by a communications link 1215 (e.g., LAN, PTSN, or wireless network) may perform the sequence of instructions required to practice embodiments of the disclosure using two or more instances of components of computer system 12A00.

The computer system 12A00 may transmit and receive messages, data, and instructions including programs (e.g., application code), through communications link 1215 and communication interface 1214. Received program code may be executed by processor 1207 as it is received and/or stored in the shown storage device or in or upon any other non-volatile storage for later execution. Computer system 12A00 may communicate through a data interface 1233 to a database 1232 on an external data repository 1231. Data items in a database can be accessed using a primary key (e.g., a relational database primary key). A module as used herein can be implemented using any mix of any portions of the system memory and any extent of hard-wired circuitry including hard-wired circuitry embodied as a processor 1207. Some embodiments include one or more special-purpose hardware components (e.g., power control, logic, sensors, transducers, etc.). A module may include one or more state machines and/or combinational logic used to implement or facilitate managing tunable progressive statistical IDs.

Various implementations of the database 1232 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing tunable progressive statistical IDs). Such files or records can be brought into and/or stored in volatile or non-volatile memory.

Figure 12B:
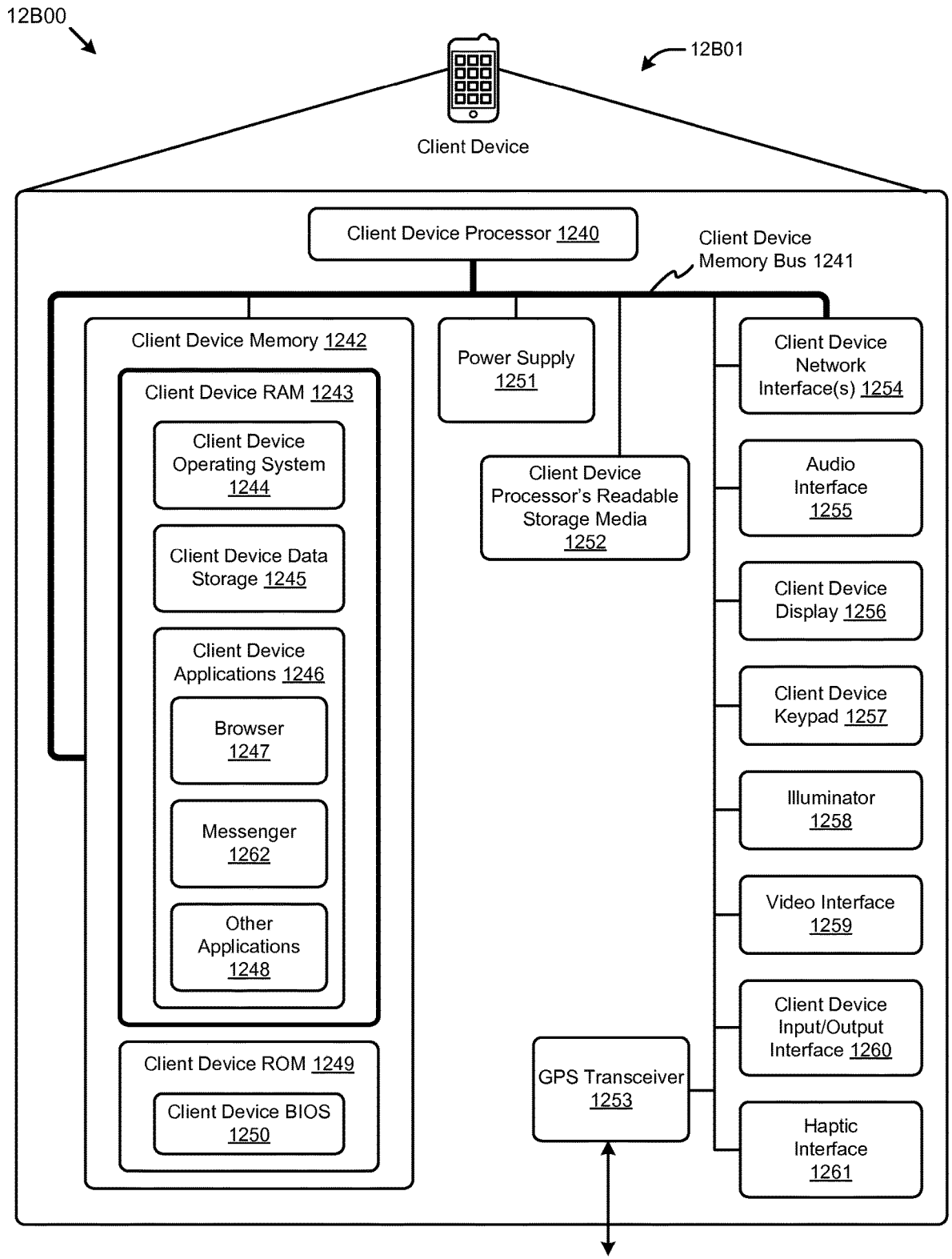

FIG. 12B depicts a block diagram 12B00 of an instance of a client device 12B01 that may be included in a system implementing instances of the herein-disclosed embodiments. Client device 12B01 may include many more or fewer components than those shown in FIG. 12B. Client device 12B01 may represent, for example, an embodiment of at least one of client devices as heretofore disclosed.

As shown in the figure, client device 12B01 includes a client device processor 1240 in communication with a client device memory 1242 via a client device memory bus 1241. Client device 12B01 also includes a power supply 1251, one or more client device network interfaces 1254, an audio interface 1255, a client device display 1256, a client device keypad 1257, an illuminator 1258, a video interface 1259, a client device IO interface 1260, a haptic interface 1261, and a GPS transceiver 1253 for global positioning services.

The power supply 1251 provides power to client device 12B01. A rechargeable or non-rechargeable battery may be used to provide power. The power may also be provided by an external power source such as an AC adapter or a powered docking cradle that supplements and/or recharges a battery.

A client device 12B01 may optionally communicate with a base station, or directly with another computing device. A client device network interface 1254 includes circuitry for coupling a client device 12B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 1254 is sometimes known as a transceiver, a transceiving device, or a network interface card (NIC).

An audio interface 1255 is arranged to produce and receive audio signals such as the sound of a human voice. For example, audio interface 1255 may be coupled to a speaker and microphone to enable telecommunication with others and/or generate an audio acknowledgement for some action.

A client device display 1256 may be a liquid crystal display (LCD), gas plasma, light emitting diode (LED), or any other type of display used with a computing device. A client device display 1256 may also include a touch sensitive screen arranged to receive input from an object such as a stylus or a digit from a human hand.

A client device keypad 1257 may comprise any input device arranged to receive input from a user. For example, client device keypad 1257 may include a push button numeric dial, or a keyboard. A client device keypad 1257 may also include command buttons that are associated with selecting and sending images.

An illuminator 1258 may provide a status indication and/or provide light. Illuminator 1258 may remain active for specific periods of time or in response to events. For example, when the illuminator 1258 is active, it may backlight the buttons on client device keypad 1257 and stay on while the client device is powered. Also, the illuminator 1258 may backlight these buttons in various patterns when particular actions are performed such as dialing another client device. An illuminator 1258 may also cause light sources positioned within a transparent or translucent case of the client device to illuminate in response to actions.

A video interface 1259 is arranged to capture video images such as a still photo, a video segment, an infrared video or the like. For example, the video interface 1259 may be coupled to a digital video camera, a web-camera or the like. A video interface 1259 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 12B01 comprise a client device IO interface 1260 for communicating with external devices such as a headset, or other input or output devices not shown in FIG. 12B. The client device IO interface 1260 can use one or more communication technologies such as a USB, infrared, Bluetooth™ port or the like. A haptic interface 1261 is arranged to as a human interface device (HID) to facilitate interaction with a user of a client device. Such interaction can include tactile feedback to a user of the client device. For example, the haptic interface 1261 may be employed to cause vibration of the client device 12B01 in a particular way (e.g., with a pattern or periodicity) and/or when interacting with one or another user.

A GPS transceiver 1253 can determine the physical coordinates of client device 12B01 on the surface of the Earth. The GPS transceiver 1253, in some embodiments, may be optional. The shown GPS transceiver 1253 outputs a location such as a latitude value and a longitude value. However, the GPS transceiver 1253 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 12B01 on the surface of the Earth. It is understood that under different conditions, a GPS transceiver 1253 can determine a physical location within millimeters for client device 12B01; and in other cases, the determined physical location may be less precise such as within a meter or significantly greater distances. In certain embodiments, the client device 12B01 may provide other information that may be employed to determine a physical location of the device including, for example, a media access control (MAC) address, IP address, IP port identifier, or the like.

The client device memory 1242 includes random access memory 1243, read-only memory 1249, and other storage means. The client device memory 1242 illustrates an example of computer readable storage media (devices) for storage of information such as computer readable instructions, data structures, program modules or other data. The client device memory 1242 stores a basic IO system (BIOS) in the embodiment of client device BIOS 1250 for controlling low-level operation of client device 12B01. The memory also stores an operating system 1244 for controlling the operation of client device 12B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 1242 further includes one or more instances of client device data storage 1245, which can be used by client device 12B01 to store, among other things, client device applications 1246 and/or other data. For example, client device data storage 1245 may also be employed to store information that describes various capabilities of client device 12B01. The information may then be provided to another device based on any of a variety of events including being sent as part of a header during a communication, sent upon request or the like. Client device data storage 1245 may also be employed to store social networking information including address books, buddy lists, aliases, user profile information or the like. Further, client device data storage 1245 may also store messages, web page content, or any of a variety of content (e.g., received content, user generated content, etc.).

At least a portion of the information may also be stored on any component or network device including, but not limited, to a client device processor's readable storage media 1252, a disk drive or other computer readable storage devices within client device 12B01, etc.

An instance of a client device processor's readable storage media 1252 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 1252 may also be referred to herein as computer readable storage media.

The client device applications 1246 may include computer executable instructions which, when executed by client device 12B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1246 may include, for example, a messenger 1262, a browser 1247, and any instances of other applications 1248. Certain other applications 1248 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 1248 may collect and store user data that may be received from other computing devices in the environment.

A messenger 1262 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1262 may be configured as an IM application such as AOL (America Online) instant messenger, Yahoo! messenger, .NET messenger server, (ICQ) or the like. In certain embodiments, the messenger 1262 may be configured to include a mail user agent (MUA) such as Elm, Pine, message handling (MH), Outlook, Eudora, Mac Mail, Mozilla Thunderbird or the like. In another embodiment, the messenger 1262 may be a client device application that is configured to integrate and employ a variety of messaging protocols including, but not limited, to various push and/or pull mechanisms for client device 12B01. In certain embodiments, the messenger 1262 may interact with the browser 1247 for managing messages. As used herein, the term "message" refers to any of a variety of messaging formats, or communications form including, but not limited to, email, SMS, IM, MMS, IRC or the like.

A browser 1247 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1247 may enable a user of client device 12B01 to communicate with another network device as may be present in the environment.

Figure 12C:
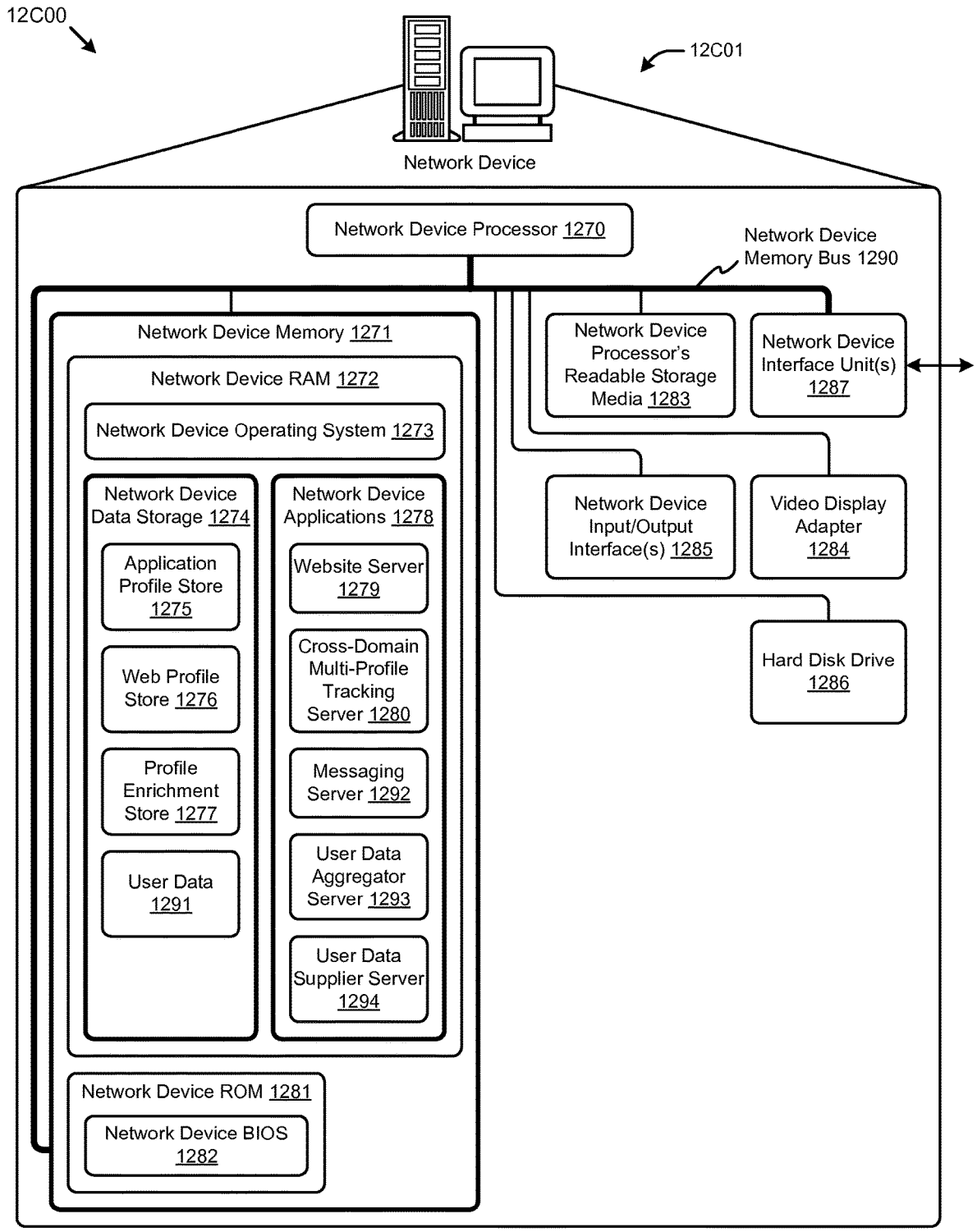

FIG. 12C depicts a block diagram 12C00 of an instance of a network device 12C01 that may be included in a system implementing instances of the herein-disclosed embodiments. Network device 12C01 may include many more or fewer components than those shown. Network device 12C01 may be configured to operate as a server, client, peer, a host, or any other device.

The network device 12C01 includes at least one instance of a network device processor 1270, instances of readable storage media 1283, network interface(s) 1287, a network device IO interface 1285, a hard disk drive 1286, a video display adapter 1284, and a network device memory 1271, all in communication with each other via a network device memory bus 1290. The network device memory generally includes network device RAM 1272, network device ROM 1281. Some embodiments include one or more non-volatile mass storage devices such as a hard disk drive 1286, a tape drive, an optical drive, and/or a floppy disk drive. The network device memory stores a network device operating system 1273 for controlling the operation of network device 12C01. Any general-purpose operating system may be employed. A basic input/output system (BIOS) is also provided in the form of network device BIOS 1282 for controlling the low-level operation of network device 12C01. As illustrated in FIG. 12C, a network device 12C01 also can communicate with the Internet, or some other communications network, via a network interface unit 1287, which is constructed for use with various communication protocols including the TCP/IP protocol. The network interface unit 1287 is sometimes known as a transceiver, a transceiving device, or a network interface card (NIC). Network device 12C01 also comprises a network device IO interface 1285 for communicating with external devices such as a keyboard or other input or output devices. A network device IO interface 1285 can use one or more communication technologies such as USB, infrared, Bluetooth™ or the like.

The storage devices as described above may use various types of computer readable media, namely non-volatile computer readable storage media and/or a client device processor's readable storage media 1283 and/or a network device processor's readable storage media 1283. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 1274 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1274 may further include program code, data, algorithms and the like, for use by a processor such as a network device processor 1270 to execute and perform actions. In certain embodiments, at least some of the logical contents of network device data storage 1274 might be stored on another component of network device 12C01, such as on a second instance of hard disk drive 1286 or on an external/removable storage device.

The network device data storage 1274 may further store any portions of application data and/or user data such as an application profile store 1275, a web profile store 1276, a profile enrichment store 1277 and/or any user data collected. In some embodiments, user data 1291 may store unique user data, non-unique user data, aggregated user data, and/or any combination thereof. User data 1291 may include a variety of attributes such as a five digit zip code, an expanded nine digit zip code and the like.

The Network device data storage 1274 may also store program code and data. One or more network device applications 1278 may be loaded into network device data storage or any other mass memory, to be accessible to run with or as a part of network device operating system 1273. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1292, website server 1279, user data aggregator server 1293, a cross-domain multi-profile tracking server 1280, and/or user data supplier server 1294 may also be included within or implemented as application programs.

A messaging server 1292 may include virtually any computing component or components configured and arranged to forward messages from message user agents and/or other message servers, or to deliver messages to a local message store such as network device data storage 1274 or the like. Thus, a messaging server 1292 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1292 may also be managed by one or more components of the messaging server 1292. Thus, the messaging server 1292 may also be configured to manage SMS messages; IM, MMS, IRC, or RSS feeds; mIRC; or any of a variety of other message types. In certain embodiments, the messaging server 1292 may enable users to initiate and/or otherwise conduct chat sessions, VOIP sessions or the like.

A website server 1279 may represent any of a variety of information and services that are configured to provide content, including messages, over a network to another computing device. Thus, a website server 1279 can include, for example, a web server, a file transfer protocol (FTP) server, a database server, a content server or the like. A website server 1279 may provide the content including messages over the network using any of a variety of formats including, but not limited to WAP, HDML, WML, SGML, HTML, XML, compact HTML (cHTML), extensible HTML (xHTML) or the like. A website server 1279 may also be configured to enable a user of a client device to browse websites, upload user data, view and interact with advertisements or the like.

A user data aggregator server 1293 is configured to aggregate user data to be provided to user data buyers for advertising campaigns. In certain embodiments, a user data aggregator server 1293 may be configured to receive collected user data from a user data supplier server 1294. In some embodiments, a user data aggregator server 1293 may receive a query for user data. Based on the query, a user data aggregator server 1293 may generate a plurality of subsets of aggregated user data. In some embodiments, user data aggregator server 1293 may be included in a network device.

A user data supplier server 1294 is configured to collect user data. In certain embodiments, the user data supplier server 1294 may be configured to provide the collected user data to user data aggregator server 1293. In some embodiments, the user data supplier server 1294 may collect and/or provide unique user data and/or non-unique user data. In certain embodiments, the user data supplier server 1294 may aggregate the collected user data. In some embodiments, the user data supplier server 1294 may be included in any computing device such as heretofore described.

Returning to discussion of the heretofore introduced environments, the environments include components with which various systems can be implemented. Not all of the components shown may be required to practice the embodiments, and variations in the arrangement and type of the components may be made without departing from the spirit or scope of the disclosure.

Various environments in which embodiments of the disclosure operate may include local area networks (LANs)/ wide area networks (WANs), wireless networks, and/or client devices (e.g., user stations). The overall network including any sub-networks and/or wireless networks are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device and/or between other networks.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:
receiving a first plurality of signals generated from operation of a plurality of user devices, each signal of the first plurality of signals comprising a first set of characteristics associated with a user device of the plurality of user devices, wherein the first set of characteristics are based at least in part on a user interaction with the user device of the plurality of user devices;
generating, using at least one characteristic of the first set of characteristics, a candidate mapping function that is configured to generate identification codes;
generating, using the candidate mapping function, a first plurality of identification codes, each identification code of the first plurality of identification codes being assigned to a user device of the plurality of user devices;
generating, using the candidate mapping function and the first plurality of identification codes, a collision metric that indicates an estimation of a quantity of user devices of the plurality of user devices that have been assigned a same identification code of the first plurality of identification codes;
determining that the collision metric is below a collision threshold;
generating, using the candidate mapping function and the first plurality of identification codes, a fragmentation metric that indicates an estimation of a quantity of identification codes of the plurality of identification code assigned to a same user device or user;
determining that the fragmentation metric is below a fragmentation threshold;
receiving a second plurality of signals;
generating a second plurality of identification codes using the candidate mapping function and the second plurality of signals;
generating, based on the second plurality of identification codes, a coverage metric that predicts a degree in which the second plurality of identification codes cover the second plurality of signals;
determining that the coverage metric exceeds a coverage threshold;
selecting, as a result of determining that the collision metric is below the collision threshold, determining that the fragmentation metric is below the fragmentation threshold, and determining that the coverage metric exceeds the coverage threshold, the candidate mapping function as a first mapping function;
receiving a new signal from a new user device, the new signal including a second set of characteristics corresponding to the new user device, wherein the second set of characteristics are based at least in part on a user interaction with the new user device;
generating, using the first mapping function, a particular identification code for the new user device based on at least one characteristic of the second set of characteristics; and
transmitting a request for content to be embedded into a webpage, the webpage being configured for display by the new user device, the request including the particular identification code corresponding to the new user device.

2. The method of claim 1, further comprising, in response to a request to identify a set of users distinguished based on one or more characteristics included in a second plurality of signals, providing an identification of a set of user devices that results from applying the first mapping function to the second plurality of signals.

3. The method of claim 1, wherein the coverage metric excludes duplicates.

4. The method of claim 1, wherein determining that the coverage metric exceeds the coverage threshold comprises reaching or surpassing a threshold amount of duplicates.

5. The method of claim 1, wherein the coverage metric uses a combination of factors based on an optimization function that maximizes one factor subject to one or more constraints of other factors.

6. The method of claim 1, further comprising:
executing a recalibration process using the collision metric.

7. The method of claim 6, wherein the recalibration process includes defining a second mapping function based at least in part on one or more fragmentation metrics.

8. The method of claim 7, further comprising determining inventory quantities using the second mapping function to determine a point of inflection.

9. The method of claim 1, wherein the first set of characteristics originate from user operation of a mobile device browser.

10. The method of claim 1, wherein the first set of characteristics originate from user operation of a mobile device app.

11. The method of claim 1, wherein the first set of characteristics an IP address of an associated user device.

12. The method of claim 1, further comprising:
calculating, using at least some of the first plurality of signals, one or more fragmentation metrics.

13. The method of claim 12, wherein the first set of characteristics includes a portion of user agent information.

14. The method of claim 1, wherein first set of characteristics includes a portion of an octet of an IP address of an associated user device.

15. A computer program product, embodied in a non-transitory computer readable medium, the computer readable medium having stored thereon a sequence of instructions which, when executed by a processor causes the processor to execute a process comprising:
- receiving a first plurality of signals generated from operation of a plurality of user devices, each signal of the first plurality of signals comprising a first set of characteristics associated with a user device of the plurality of user devices, wherein the first set of characteristics of are based at least in part on a user interaction with the user device of the plurality of user devices;
- generating, using at least one characteristic of the first set of characteristics, a candidate mapping function configured to generate identification codes;
- generating, using the candidate mapping function, a first plurality of identification codes, each identification code of the first plurality of identification codes being assigned to a user device of the plurality of user devices;
- generating, using the candidate mapping function and the first plurality of identification codes, a collision metric that indicates an estimation of a quantity of user devices of the plurality of user devices that have been assigned a same identification code of the first plurality of identification codes;
- determining that the collision metric is below a collision threshold;
- generating, using the candidate mapping function and the first plurality of identification codes, a fragmentation metric that indicates an estimation of a quantity of identification codes of the plurality of identification code assigned to a same user device or user;
- determining that the fragmentation metric is below a fragmentation threshold;
- receiving a second plurality of signals;
- generating a second plurality of identification codes using the candidate mapping function and the second plurality of signals;
- generating, based on the second plurality of identification codes, a coverage metric that predicts a degree in which the second plurality of identification codes cover the second plurality of signals;
- determining that the coverage metric exceeds a coverage threshold;
- selecting, as a result of determining that the collision metric is below the collision threshold, determining that the fragmentation metric is below the fragmentation threshold, and determining that the coverage metric exceeds the coverage threshold, the candidate mapping function as a first mapping function;
- receiving a new signal from a new user device, the new signal including a second set of characteristics corresponding to the new user device, wherein the second set of characteristics are based at least in part on a user interaction with the new user device;
- generating, using the first mapping function, a particular identification code for the new user device based on the at least one characteristic of the second set of characteristics; and
- transmitting a request for content to be embedded into a webpage being configured for display by the new user device, the request including the particular identification code corresponding to the new user device.

16. The computer program product of claim 15, wherein the coverage metric excludes duplicates.

17. The computer program product of claim 15, wherein determining that the coverage metric exceeds the coverage threshold comprises reaching or surpassing a threshold amount of duplicates.

18. A system comprising:
- one or more processors;
- a non-transitory computer readable medium storing a sequence of instructions which, when executed by the one or more processors, cause the processor to perform operations including:
  - receiving a first plurality of signals generated from operation of a plurality of user devices, each signal of the first plurality of signals comprising a first set of characteristics associated with a user device of the plurality of user devices, wherein the first set of characteristics are based at least in part on a user interaction with the user device of the plurality of user devices;
  - generating, using at least one characteristic of the first set of characteristics, a candidate mapping function that is configured to generate identification codes;
  - generating, using the candidate mapping function, a first plurality of identification codes, each identification code of the first plurality of identification codes being assigned to a user device of the plurality of user devices;
  - generating, using the candidate mapping function and the first plurality of identification codes, a collision metric that indicates an estimation of a quantity of user devices of the plurality of user devices that have been assigned a same identification code of the first plurality of identification codes;
  - determining that the collision metric is below a collision threshold;
  - generating, using the candidate mapping function and the first plurality of identification codes, a fragmentation metric that indicates an estimation of a quantity of identification codes of the plurality of identification code assigned to a same user device or user;
  - determining that the fragmentation metric is below a fragmentation threshold;
  - receiving a second plurality of signals;
  - generating a second plurality of identification codes using the candidate mapping function and the second plurality of signals;
  - generating, based on the second plurality of identification codes, a coverage metric that predicts a degree in which the second plurality of identification codes cover the second plurality of signals;
  - determining that the coverage metric exceeds a coverage threshold;
  - selecting, as a result of determining that the collision metric is below the collision threshold, determining that the fragmentation metric is below the fragmentation threshold, and determining that the coverage metric exceeds the coverage threshold, the candidate mapping function as a first mapping function;
  - receiving a new signal from a new user device, the new signal including a second set of characteristics corresponding to the new user device, wherein the second set of characteristics are based at least in part on a user interaction with the new user device;

generating, using the first mapping function, a particular identification code for the new user device based on at least one characteristic of the second set of characteristics; and
transmitting a request for content to be embedded into a webpage being configured for display by the new user device, the request including the particular identification code corresponding to the new user device.

* * * * *

UNITED STATES PATENT AND TRADEMARK OFFICE
CERTIFICATE OF CORRECTION

PATENT NO. : 10,878,457 B2  
APPLICATION NO. : 14/791074  
DATED : December 29, 2020  
INVENTOR(S) : Chan et al.

Page 1 of 1

It is certified that error appears in the above-identified patent and that said Letters Patent is hereby corrected as shown below:

In the Specification

In Column 6, Line 59, delete "(country level)," and insert -- (country level). --, therefor.

In Column 9, Line 67, delete "{User Agent,IP}" and insert -- {User Agent, IP} --, therefor.

In Column 10, Line 20, delete "$Word_{35Octet}$" and insert -- $Word_{3.5Octet}$ --, therefor.

In Column 19, Line 39, delete "the a" and insert -- the --, therefor.

In the Claims

In Column 30, Line 64, in Claim 11, delete "an IP address" and insert -- includes an IP address --, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*